(12) United States Patent
Merriam et al.

(10) Patent No.: US 8,676,633 B2
(45) Date of Patent: Mar. 18, 2014

(54) OFFICE DOCUMENT ASSESSMENT METHOD AND SYSTEM

(75) Inventors: Ray Merriam, Rochester, NY (US); Kirk Pothos, Webster, NV (US); Holly Turner, Rochester, NY (US); Craig Mallery, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 3206 days.

(21) Appl. No.: 11/186,674

(22) Filed: Jul. 21, 2005

(65) Prior Publication Data

US 2006/0178917 A1 Aug. 10, 2006

Related U.S. Application Data

(60) Provisional application No. 60/650,864, filed on Feb. 8, 2005.

(51) Int. Cl.
*G06Q 10/00* (2012.01)

(52) U.S. Cl.
USPC .................................. 705/7.37; 705/7.38

(58) Field of Classification Search
USPC ..................... 705/7, 7.11, 7.12, 7.37, 7.38
See application file for complete search history.

(56) References Cited

U.S. PATENT DOCUMENTS

| 2003/0135399 | A1* | 7/2003 | Ahamparam et al. | 705/7 |
| 2004/0215533 | A1* | 10/2004 | Doeberl et al. | 705/30 |
| 2004/0249655 | A1* | 12/2004 | Doeberl et al. | 705/1 |
| 2006/0085242 | A1* | 4/2006 | Mark | 705/8 |

OTHER PUBLICATIONS

Is Corporate Insoucing of Print on the Rise? A research monograph of the Printing Industry Center at RIT.—by Sorce et al. Dec. 2004.*

* cited by examiner

*Primary Examiner* — Andre Boyce
*Assistant Examiner* — Ernest A Jackson
(74) *Attorney, Agent, or Firm* — Duane C. Basch; Basch & Nickerson LLP

(57) ABSTRACT

A method and system for the assessment of the office document production environment(s) in a facility, and more particularly to a client-based method and system that can be used to collect, analyze, model, optimize, and report on document output costs and efficiencies in an office environment.

10 Claims, 28 Drawing Sheets

FIG. 7A

| Project: ODA Project Sample | | | |
|---|---|---|---|
| Assets | Collection List | | |
| Asset Number △ | Manufacturer Name | Model Name | Device Type |
| 0000AA5712D7 | Xerox | DocuPrint N2825 | Printer B&W Network |
| 0000AA57401F | Xerox | DocuPrint N17 | Printer B&W Local |
| 0000AA5C09CD | Xerox | DocuPrint N2125 | Printer B&W Network |
| 0000AA5E1F9C | Xerox | DocuPrint N4025 | Printer B&W Network |
| 0000AA5E2090 | Xerox | DocuPrint N4025 | Printer B&W Network |
| 0000AA610E4A | Xerox | Document Centre 470 ST | MFD B&W Network |
| 0000AA611E9D | Xerox | Document WorkCentre Pro 90 | Personal All-In-1 B&W |
| 0000AA6147E9 | Xerox | Document Centre 490ST | MFD B&W Network |
| 0000AA615F52 | Xerox | Document Centre 470 ST | MFD B&W Network |
| 0000AA6204A7 | Xerox | Document Centre 470 ST | MFD B&W Network |
| 0000AA650766 | Xerox | Document WorkCentre Pro 32 Color | Personal All-In-1 Color |
| 0000AA65EE53 | Xerox | Document WorkCentre Pro 55 | Personal All-In-1 B&W |

FIG. 8

Project Defaults — 1020

Tabs: Cost by Page Contracts | Model Class Management — 1022 | Device Types Management — 1024 | Include Costs Profile — 1026 | Assessment Management — 1028

1010

New Cost by Page Contract

| Contract Name | Contract Type | Contract Provider | Monthly Base Cost ($) | Supplies Included |
|---|---|---|---|---|
| Xerox Lease | Lease | Xerox | 250 | ☑ |
| HP Lease | Lease | HP | 310 | ☐ |
| Xerox Service | Service | Xerox | 70 | ☐ |
| HP Service | Service | HP | 98 | ☐ |
| Xerox Supplies | Supply | Xerox | 180 | ☑ |
| HP Supplies | Supply | HP | 176 | ☑ |

FIG. 10

| XYZ Cost Savings Summary | Current State | Future State |
|---|---|---|
| Hard Cost | | |
| Total Estimated Corporate Annual Output Spend | $10,497,190 | $8,246,615 |
| Total Annual Hard Cost for Local Print Acquisition | $56,400 | $0 |
| Total Annual Hard Cost Labor for Supplies | $60,480 | $302,400 |
| Total Annual Hard Cost Spend for Support | $145,135 | TBD |
| Total Hard Cost Spend | $10,759,205 | $8,549,015 |
| Soft Cost | | |
| Total Annual Soft Cost Spend for Acquisition | $33,360 | $23,354 |
| Total Annual Soft Cost Spend for Support | $255,516 | $162,528 |
| Total Annual Soft Cost Spend for Supplies | $748,296 | $0 |
| Total Soft Cost Spend | $1,037,172 | $185,882 |
| TOTAL | $11,796,377 | $8,734,897 |

FIG. 20

OFFICE DOCUMENT ASSESSMENT METHOD AND SYSTEM

The present application claims priority from U.S. Provisional Application No. 60/650,864 by R. Merriam et al., filed Feb. 8, 2005, the disclosure of which is incorporated herein by reference in its entirety.

Disclosed are methods and systems relating generally to the assessment of office document production in a customer's facilities, and more particularly to client-based methods and systems used to collect, analyze, model, optimize, and report on document output costs and efficiencies in an office environment.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

Disclosed in embodiments herein is an office document assessment tool (method and system) that may be employed with other tools in a suite of applications used to provide large customer accounts with a comprehensive asset (e.g., printers, copiers, facsimile machines and the like) management solution. In one embodiment, this system includes a Device Manager, an Asset Manager, and an Office Document Assessment Tool (XODAT) as described in detail herein. The Device Manager, operating on a central server, provides a foundation for printer management and repair. This enterprise-capable application provides discovery and management services for network-connected printers. The Asset Management tool, also server based, is designed to track assets as well as provide a foundation for billing for asset usage contained within service plans in an organization. This module receives device information directly from installed servers or indirectly from importing asset information. The Asset Manager provides the ability to convert the server's discovered and monitored printers into assets so that the Asset Manager can be used to track both network connected and non-network connected assets.

In one embodiment the method and system are characterized as a client-based office document output assessment application or tool. With the tool a specialist can collect, analyze, and model document output in an office environment. From this analysis, a report may be generated and presented to the customer showing the customer how much they are spending on document output at present (current state), and how much the customer could save by optimizing their print environment through the consolidation of devices and the purchase of multifunction devices (e.g., Xerox® Document Centre). Unlike other tools, which use estimated data, the tool inventories existing devices and measures output over a defined (e.g., one-month) sample period. As the basis for such a tool, output meter data is entered into the system through manual entry, import of spreadsheets, as well as import from the Asset Manager or Device Manager (i.e., automatic entry using embedded network device discovery feature), if present. Information on devices, including features, performance, supplies, and price is pulled from an up-to-date Model Database maintained for multiple office devices. Additionally, the inventory and data collection process follows Six Sigma guidelines for accuracy and consistency.

As will be appreciated, the customer's location(s) define many costs such as floor cost, power cost, and support cost. An embodiment of the system and method described herein accommodates the possibility of varying costs across multiple customer facilities and locations by allowing a project to be broken down into areas. Each area can have its own set of localized values for given properties (e.g., space and power costs). The tool uses all of an asset's properties, including its model and consumable information, and customer specific properties to generate costs, usage, and related metrics—on an area, building/location and project basis. Once the customer's current state for document output is established, the system and method may be employed to model proposed changes so as to optimize devices in the office environment and show how changes can improve the customer's costs, usage, and related metrics and customer satisfaction. Moreover, once all of the analysis and scenario modeling is complete, the customer specialist can use the system reporting capabilities to build reports (e.g., Microsoft® Excel) that can be used to create customer presentations.

According to aspects disclosed herein, there is provided an office document environment assessment method, comprising: capturing a current state of a customer's office document environment, the environment including office document device inventory, cost of operation and usage information for a plurality of pieces of office document equipment; analyzing the current state of the customer's office document environment within a plurality of defined areas to characterize at least one cost and usage metric for each area, and aggregating such cost and usage metrics to generate project metrics; depicting the current state of the customer's office document environment in association with the project metrics; and modeling projected operating costs of an optimized office output device environment for the customer, said model being based upon the usage metrics for the plurality of defined areas.

In accordance with another aspect of the present disclosure, there is provided an office document environment assessment system, comprising: a project database for capturing a current state of a customer's office document environment, the environment including office document device inventory, cost of operation and usage information for a plurality of pieces of office document equipment; a models database containing cost and related information for a plurality of types and models of office document equipment; a computer for analyzing, using the project and models databases, the current state of the customer's office document environment within a plurality of defined areas to characterize each area's cost and usage metrics, and aggregating each area's cost and usage metrics to generate project metrics, said current state and metrics being stored in a memory associated with said computer; and the computer further generating a report depicting the current state of the customer's office document environment in association with cost and usage metrics, and modeling projected operating costs of an optimized office output device environment for the customer, said model being based upon the usage metrics for the plurality of defined areas.

In accordance with yet a further aspect of the present disclosure, there is provided an office document environment assessment method, comprising: capturing a current state of a customer's office document environment, the environment including office document device inventory, cost of operation and usage information for a plurality of pieces of office document equipment, including creating a project, having project properties and contact information and at least one data collection document with a location map and an associated data collection worksheet; validating the current state of the customer's office document environment with the customer; using a models database including data reflecting office document equipment specification and operating costs, analyzing the current state of the customer's office document environment within a plurality of defined areas to characterize at least one cost and usage metric for each area, and aggregating such cost and usage metrics to generate project metrics, including characterizing the customer's costs for document output, and providing at least one metric indicating efficiency of the customer's office document environment; depicting the current state of the customer's office document environment in association with the project metrics; modeling projected operating costs of an optimized office output device environment for the customer, said model being based upon the usage metrics for the plurality of defined areas; and reporting the current state of the customer's office document environment and the optimized office output device environment, including projected costs and efficiencies thereof.

BRIEF DESCRIPTION OF THE DRAWINGS

FIGS. 7A, 7B, and 8-10 are illustrative representations of information within a project database in accordance with the system and method disclosed;

FIGS. 19-20 illustrate exemplary reports generated by the ODA application during an analysis process.

Figure 1:
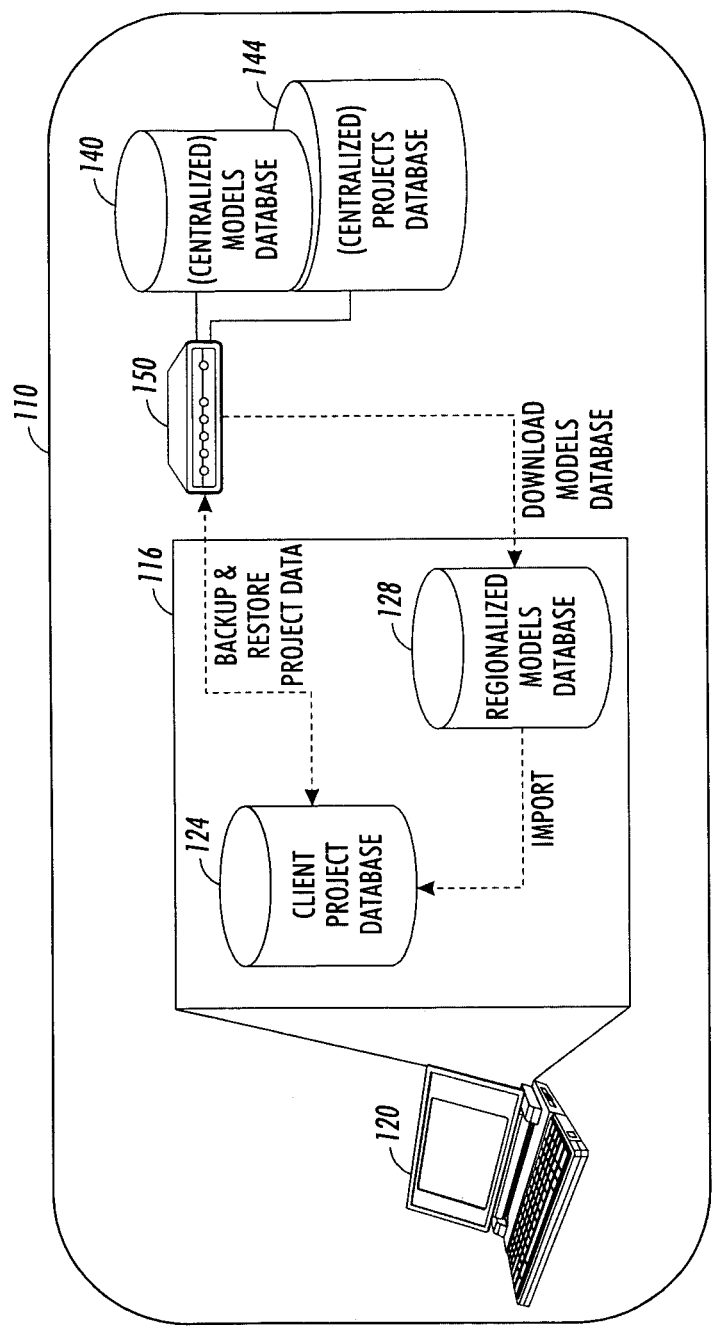
FIG. 1 is a general illustration of an embodiment of the office document assessment (ODA) system and methods disclosed herein.

The systems and methods will be described in connection with a preferred embodiment, however, it will be understood that there is no intent to limit the systems or methods to the embodiment described. On the contrary, the intent is to cover all alternatives, modifications, and equivalents as may be included within the spirit and scope of the appended claims.

DETAILED DESCRIPTION

For a general understanding of the systems and methods, reference is made to the drawings. In the drawings, like reference numerals have been used throughout to designate identical elements. The Office Document Assessment (ODA) Tool is, in one embodiment, an application that calculates operating cost and utilization for office output devices, and when combined with an asset tracking service helps to manage these assets. In general, ODA is employed to assess device cost-effective operation and utilization in an enterprise and to analyze how costs can be reduced and utilization improved. The following terms are employed in accordance with aspects of the following description:

| | |
|---|---|
| Additional Hard Cost | costs that can be applied to an asset either at the asset, area, or model level. |
| Additional Soft Cost | costs that can be applied to an asset either at the asset, area, or model level. |
| Asset Depreciation Cost | amount a client spends each month when the purchase price of an asset is distributed over the asset's useful life (Refresh Rate). When using Post Depreciation this value becomes the monthly refresh cost. |
| Asset Total Cost | summation of all of the assets hard and soft costs. |
| Average Daily (Job) Volume | averaged amount of job tracking volume printed daily. |
| Average Daily (Meter) Volume | averaged amount of volume printed daily for an asset meter. |
| Black Consumable Cost | cost of black consumables directly related to black document output. |
| Black Consumable Cost per Page | black-only consumable as used by each asset, this is the calculated cost per page based on the combination of the consumables measured cost per page and the adjustment made by the Measured Black Usage. |
| Black Contract Cost | the portion of the total contract costs that can be directly associated to black output or printing. |
| Black Cost per Page | summation of the Cost per Page for all of the Black Consumables used by an asset. |
| Black Depreciation Cost | a portion of the monthly depreciation costs that can be directly associated to black document output. |
| Black Hard Output Cost | costs associated with the use and ownership of equipment, that are directly tied into the use of black consumables. |
| Black Operating Hours | number of hours an asset was running or printing based on the Black PPM and the Black volume. |

-continued

| | |
|---|---|
| Black Operating Minutes | number of minutes an asset was running or printing based on the Black PPM and the Black volume. |
| Black Overage Cost | cost when the total black volume output on a device surpasses the amount allowed or specified on the equipment, service, or supplies contract. |
| Black Service Cost | a portion of the monthly service costs that can be directly associated to black document output. |
| Black Volume Ratio | percentage of the overall volume that was outputted only using black consumables. |
| Color Consumable Cost | cost of both black and color consumables cost directly related to color document output. |
| Color Consumable Cost per Page | the calculated cost per page based on the combination of the consumable's measured cost per page and the adjustment made by the Measured Color Usage. |
| Color Contract Cost | the portion of the total contract costs that can be directly associated to color output or printing. |
| Color Cost per Page | a summation of the Cost per Page for all of the Color Consumables used by an asset. |
| Color Depreciation Cost | the portion of the monthly depreciation costs that can be directly associated to color document output. |
| Color Hard Output Cost | costs associated with the use and owner ship of equipment that, are directly tied into the use of color consumables. |
| Color Operating Hours | The number of hours an asset was running or printing based on the Color PPM and the Color volume. |
| Color Operating Minutes | The number of minutes an asset was running or printing based on the Color PPM and the Color volume. |
| Color Overage Cost | This cost occurs when the total Color volume outputted on a device surpasses the amount allowed or specified on the equipment, service, or supplies contract. |
| Color Service Cost | This is the portion of the monthly service costs that can be directly associated to Color document output. |
| Color Volume Ratio | The percentage of the overall volume that was outputted using Color consumables. |
| Device Utilization | A measure of the productivity or busyness of an Asset. It describes, based on the Asset's observed page volume, the fraction of available work time that the Asset was running. |
| Employee to Device Ratio | The number of employees per asset. |
| First Meter Read Date | When using single meter mode this is the day the device printed it very first document. |
| Hard Cost | The summation of all of the assets hard costs, including Equipment, Service, Supplies, Network, Phone, ETC. |
| Hard Infrastructure Cost | Summation of all Hard Infrastructure Costs such as Phone, Network, and Power. |
| Hard Network Cost | The amount the client spends each month on Network drop fees that could be recovered by disconnecting the network connection. |
| Hard Output Cost per Employee | The average cost per employee for Hard Output costs, which include equipment, service and supplies. |
| Hard Output Cost per Page | The average cost per page for Hard Output costs, which include equipment, service and supplies. |
| Hard Phone Cost | The amount the client spends each month on phone line fees that could be recovered by removing the phone line. |
| Help Desk Costs | Document output costs related to the running of a Help Desk or support call center. |
| Hours per Month | Because most assets rarely get turned off, the number of hours in a month that it can be running is a full day times the number of days within a standard month. |
| Idle Power use | This is the amount of power, in watts used when the asset is not generating document output. |
| Images per Employee Ratio | The average number of simplex pages outputted per employee. |
| Infrastructure Cost per Employee | The average cost per employee for Infrastructure costs, which include Phone, Network, Power, Space, Support, and Additional. |
| Infrastructure Cost per Page | The average cost per page for Infrastructure costs, which include Phone, Network, Power, Space, Support, and Additional. |
| Measured Black Usage | This is an adjustment factor for Black output volume that, based on Area coverage and Paper Usage, can be used to either increase or decrease the amount of consumables used. This has a direct impact on the cost of Consumable used by each asset. |

-continued

| | |
|---|---|
| Measured Color Usage | This is an adjustment factor for Color output volume that, based on Area coverage and Paper Usage, can be used to either increase or decrease the amount of consumables used. This has a direct impact on the cost of Consumable used by each asset. |
| Meter Volume | The difference between the fist and last meter. |
| Minutes of Operation | For each asset this is the number of minutes that the office environment it is in is in operation or open. |
| Monthly (Job) Volume | The averaged job tracking volume during a Standard 30 Day Month. |
| Monthly (Meter) Volume | The averaged volume for that meter during a Standard 30 Day Month |
| Monthly Black Volume | The total monthly volume that is directly tied to the use of Black consumables. |
| Operating Hours | The number of hours an asset was running or printing based on its PPM and Volume. |
| Other Costs | Other document output related costs |
| Paper Usage | This is an adjustment factor that, based on the amount and size of the paper used, can be used to either increase or decrease the amount of consumables used. This is tied in with the assets Area Coverage and has a direct impact on the cost of Consumable used by each asset. |
| Power Cost | The amount the client spends each month in power to run that asset. |
| Print Job Volume | When using Job tracking data this is the summation of all print queues assigned to the device. |
| Processing Costs | Document output costs related to the managing, ordering and purchasing of supplies and equipment. |
| Run Power use | This is the amount of power, in watts used when the asset is generating document output. |
| SBURD Cost per Employee | The average cost per employee for enterprise SBURD Costs. |
| SBURD Costs | The summation of the clients Enterprise costs such as: Help Desk, Processing, and Wages. |
| Soft Cost | The summation of all of the assets Soft Infrastructure costs. |
| Soft Infrastructure Cost | Summation of all Soft Infrastructure Costs such as Phone, Network, and Space. |
| Soft Network Cost | The amount the client spends each month on Network fees that can not be recovered by disconnecting the network connection. |
| Soft Phone Cost | The amount the client spends each month on phone line fees that can not be recovered by removing the phone line. |
| Space Cost | The amount the client spends each month either in office maintenance, rent, or lease for the space used by the asset. |
| Square Feet | The estimated amount of space needed to use and support an asset. For those using the metric system Square Feet is converted in Square Meters. |
| Support Cost | The Asset's Monthly Support Cost |
| Total Cost per Page | The average cost per page for all costs including Hard, Soft and SBURD costs (where applicable). |
| Total Document Output Cost per Employee | Summations of the Hard Output Cost per Employee, Infrastructure Cost per Employee, and SBURD Cost per Employee (where applicable). |
| Wages Costs | Document output costs related to the employees needed to manage the environment. To so such things as manage, order and purchase supplies and equipment. |
| Work Days per Month | For each asset this is the number of working days with in the month that users would normally be using the asset. |

Figure 2:
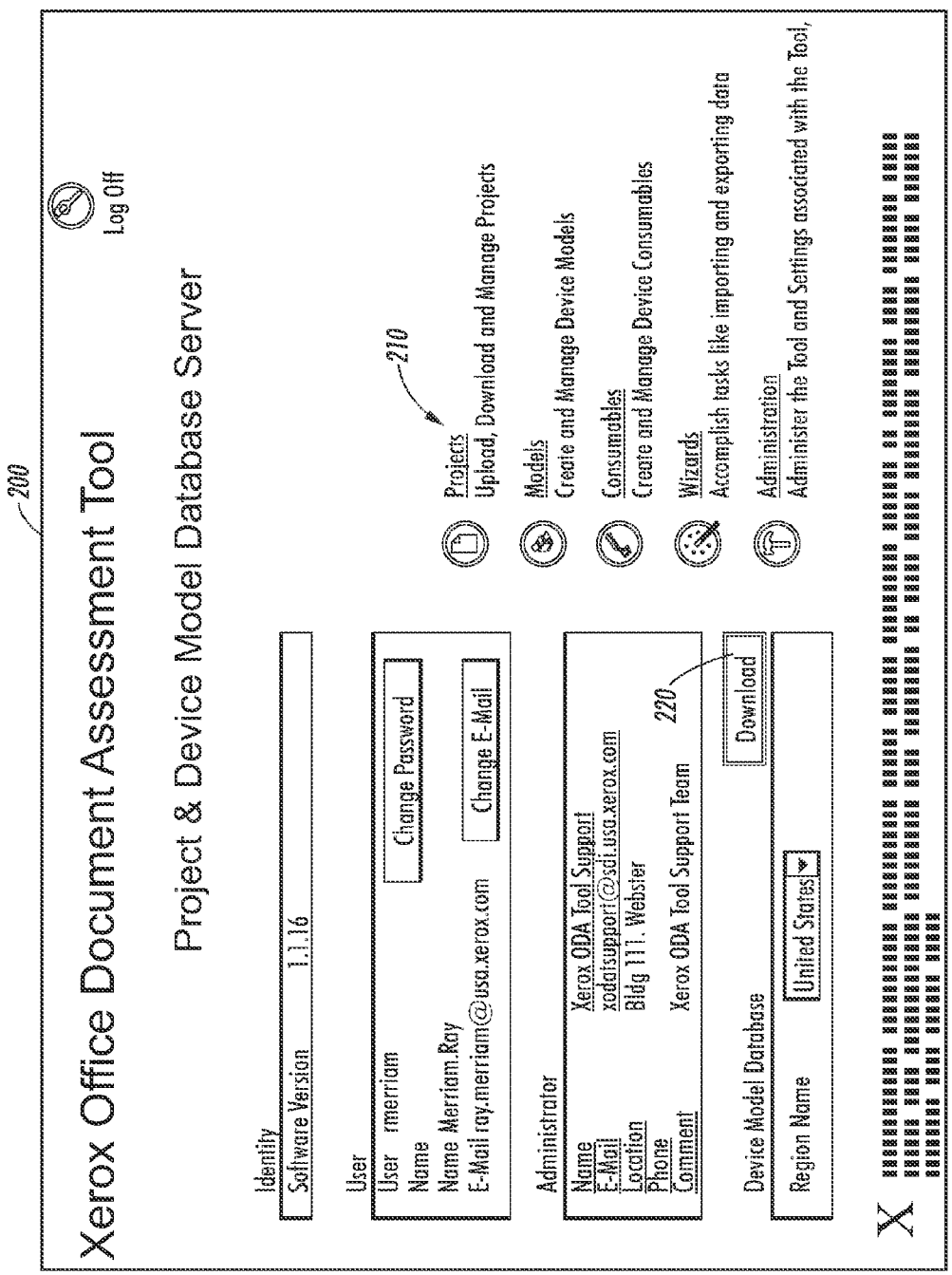
FIG. 2 is an exemplary upper-level user interface screen for an embodiment of the ODA system.

As illustrated in FIGS. 1 and 2, the ODA system 110 is a client-based office document output assessment application 116 with which a specialist can collect, analyze, and model document output in an office environment. The application 116 is typically installed on an analyst's portable workstation or laptop computer 120 and carried to the customer's facility for data gathering. More specifically, a laptop running the application 116 may include a 2 GHz Pentium 4/Pentium M or higher, at least 512 MB RAM, and approximately 400 MB of free disk space. In one embodiment the application runs in a Microsoft® Windows XP Professional environment and includes Microsoft® Office, Microsoft .NET Framework, and Microsoft® Visio 2003. It will be further appreciated that various computing platforms may be employed for operation of the software and methods disclosed, and that such applications may also be provided in a client/server and remote/host configuration.

From the analysis facilitated by the application 116, a report may be generated and presented to the customer showing the customer, among other things, how much they are spending on document output today, and how much they could save by optimizing the print environment through the consolidation of devices and the purchase of multifunction devices. As will described in further detail below, the application, or more particularly, the associated systems and methods, include several primary steps or phases:

Data Collection: Although possible to employ estimated usage data, the method preferably employs actual usage data from office document equipment, the data being determined by reviewing a customer's site to inventory existing devices and measure output over a defined sample period (e.g., one-month). Output meter data is entered into the ODA application through manual entry on laptop 120, and through the import of spreadsheets, import from other asset or device management systems, or automatic entry using embedded network device discovery features. The data collected is stored within a client project database 124 that is a component of application 116. Information on devices, including features, performance, supplies, and costs is pulled from an up-to-date Model Database 140 maintained for all office devices and downloaded/updated to a "regionalized" models database 128 for use with the application. Additionally, the inventory and data collection process follows Six Sigma guidelines for accuracy and consistency.

Customer Specific Data: Customer location defines many costs such as floor cost, power cost, and support cost. The ODA application 116 accommodates this need by allowing a project to be broken down into regions and areas. Each area can have its own set of localized values (e.g., costs) for given properties. Customers typically have discount plans with print supplies vendors and unique service contracts, and the ODA specialist enters this data into the application to enable a precise modeling of actual costs.

Data Analysis: ODA uses all of an asset's properties, including its model and consumable information, and customer specific properties to come up with costs, usage, and related metrics. ODA rolls up all data for each asset in an area to come up with that area's costs, usage, and other metrics. Moreover, the system and method are designed to continue this rollup over an entire project. As illustrated, for example, by the workstation's user-interface screen 200 of FIG. 2, the ODA specialist may access and manage multiple projects (FIG. 2; button 210), and create or update/adjust data within the project database. In addition, the device models, or Models database, can be downloaded from a centralized server 150 (via button 220); so that they may be employed in the data collection and analysis (models include equipment specifications, etc. as described in further detail below). The analysis phase reveals what the customer is currently paying for document output, and provides key metrics, based on Six Sigma process definitions, as to how efficient the customer's office document environment really is.

Scenario Modeling: Once the customer's current document output state is established, the ODA specialist uses the application to model proposed changes, with the intention of optimizing devices in the office environment, and to show a customer how changes can reduce costs yet improve usage, metrics and customer satisfaction. The ODA specialist can remove old devices, move under-utilized devices, or add new high performance or multifunction devices into existing areas.

Reporting: Once all of the analysis and scenario modeling is complete, the ODA specialist can use the application's reporting capabilities to build spreadsheets and related reports to create customer presentations, proposals, etc.

As illustrated in FIG. 1, three different databases are involved (stored and accessed) when performing documentation assessments using ODA. They are the master or centralized Device Models & Projects Database (140, 144), the local or regionalized Models Database 128, and the Project Database 124 (distinct for each client/project).

The Master Device Models Database (MDMDB) 140, 144 is a centrally managed database that contains the most current information available about document output devices. The MDMDB is updated both periodically and on demand by dedicated personnel via a master database website. The ODA client application 116 uses this information in a secure and controlled fashion to provide accurate document assessments. The client workstation also contains a local copy of the device Models Database (LDMDB) 128, which contains models that are local to the country or region being served. In one embodiment, this database is obtained by downloading it from the ODA website. Furthermore, each project residing on the laptop workstation will have its own unique Project Database 124, which will contain an imported copy of the LDMDB, as well as all Project-related data.

Figure 3:
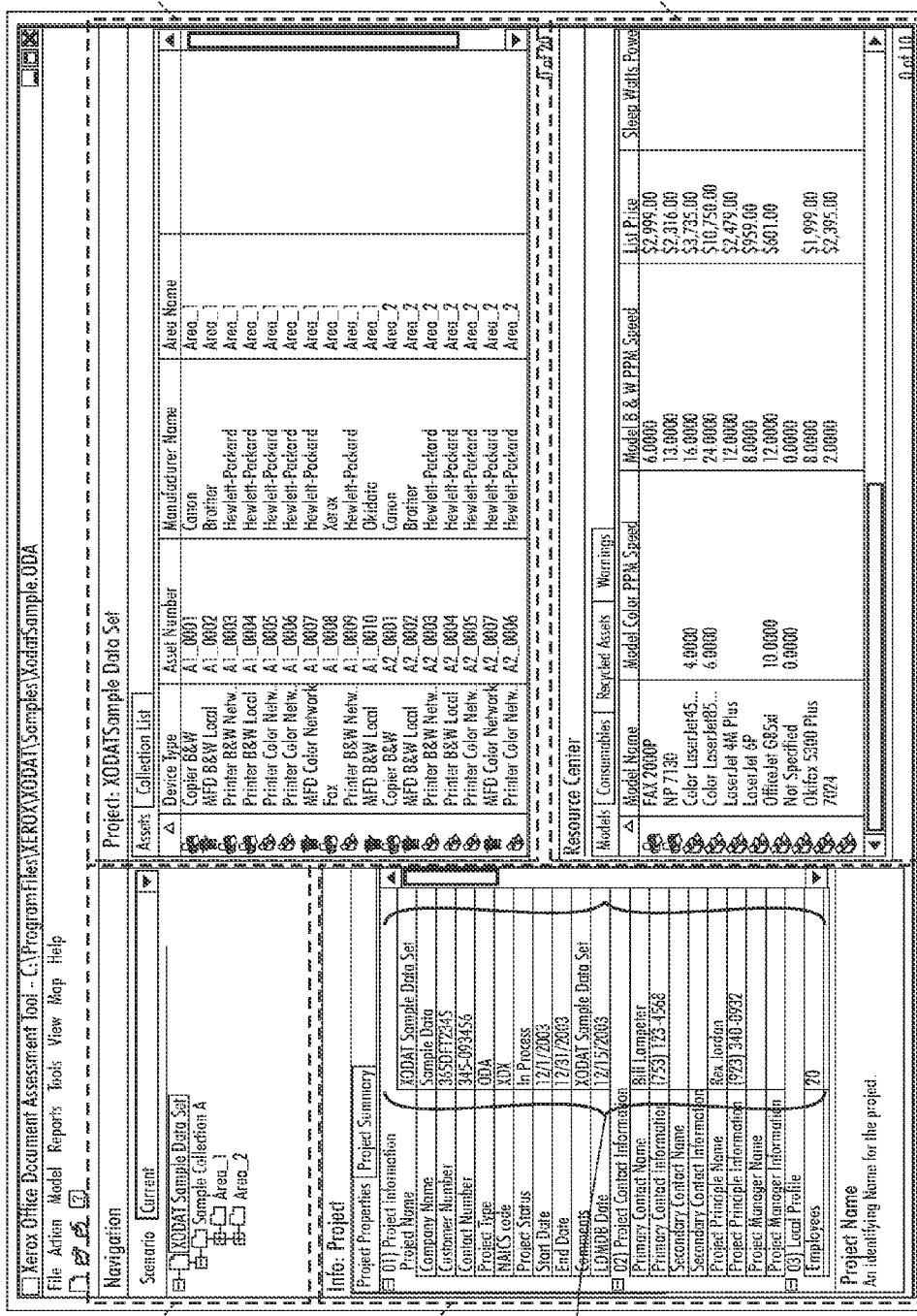
FIG. 3 is an exemplary illustration of a project interface in accordance with the system of FIGS. 1 and 2.

Referring next to FIGS. 3-6, the ODA system and method further characterize various aspects of the client's environment as areas are selected for inclusion in the project and determine the depth of the final analysis. Briefly, FIG. 3 illustrates one user-interactive screen 310 that may be used to access, edit and control various aspects of a project. The screen (which may be depicted in a windowed panel on the workstation), includes a navigation panel 320, an information panel 330 in which project properties and information 334 are reflected, a main panel 340, and a resource center region 350. The information displayed and the functionality of the panels and regions in screen 310 will be described in more detail below, but are generally characterized here to provide a framework in which the general methodology may be presented.

Figure 6:
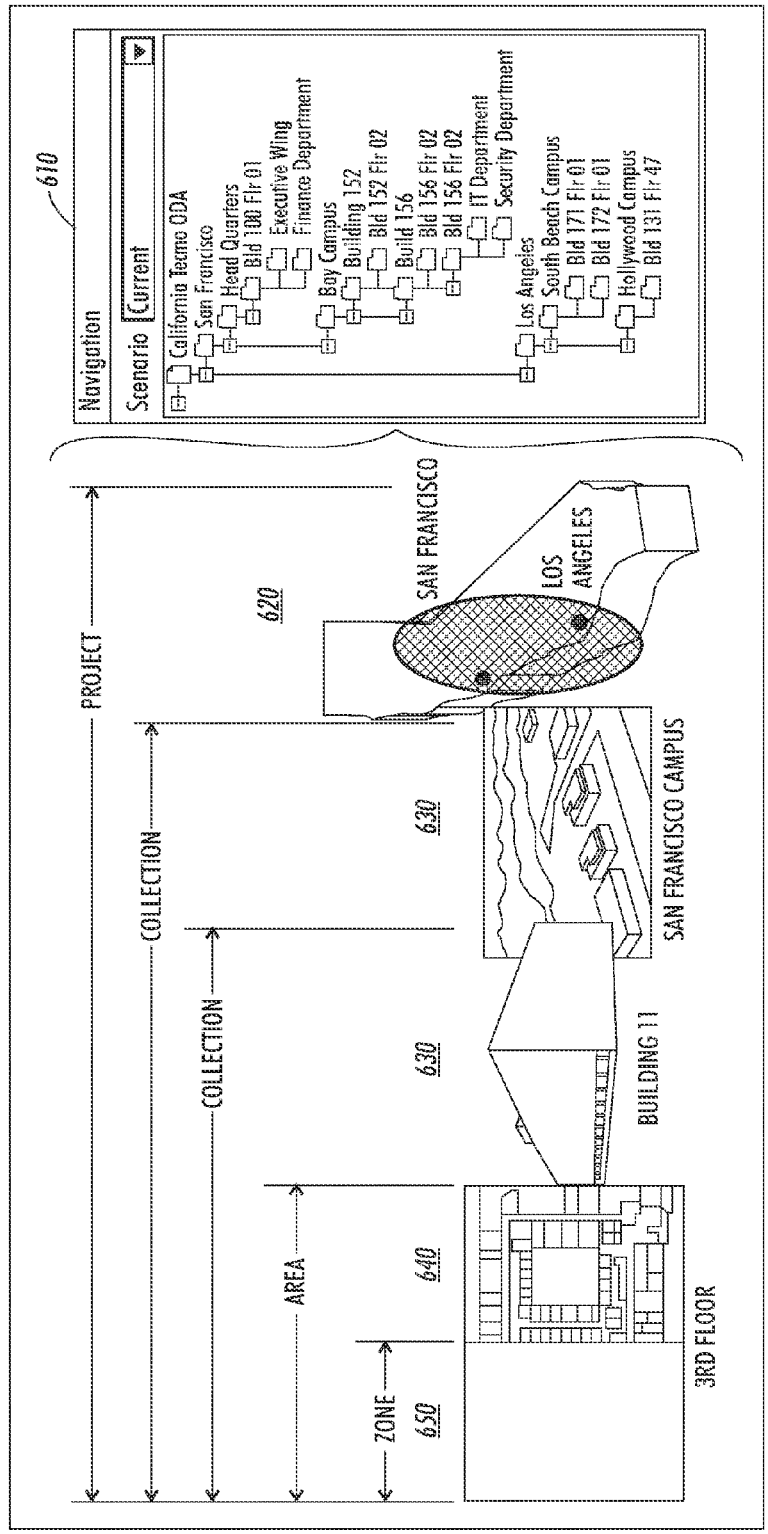
FIG. 6 is an illustrative representation of the method in which a project may be characterized in accordance with the method disclosed herein.

Referring now to the general methodology for ODA, it will be appreciated that a client's departmental, cost allocation or budgeting structures may dictate how to group document production assets in the ODA analysis into reporting groups. The Reporting Groups most likely will not strictly follow the physical layout of a project: based on collections (usually buildings), areas (usually floors) and zones (parts of floors) as depicted in FIG. 6. Briefly referring to FIG. 6, it will be appreciated that the physical layout may be depicted as a hierarchical representation as in window 610. Moreover, the ODA application is designed to provide flexibility so that any analysis or reporting can be based upon the client's requirements (i.e., the level of customer-specific information).

Figure 4:
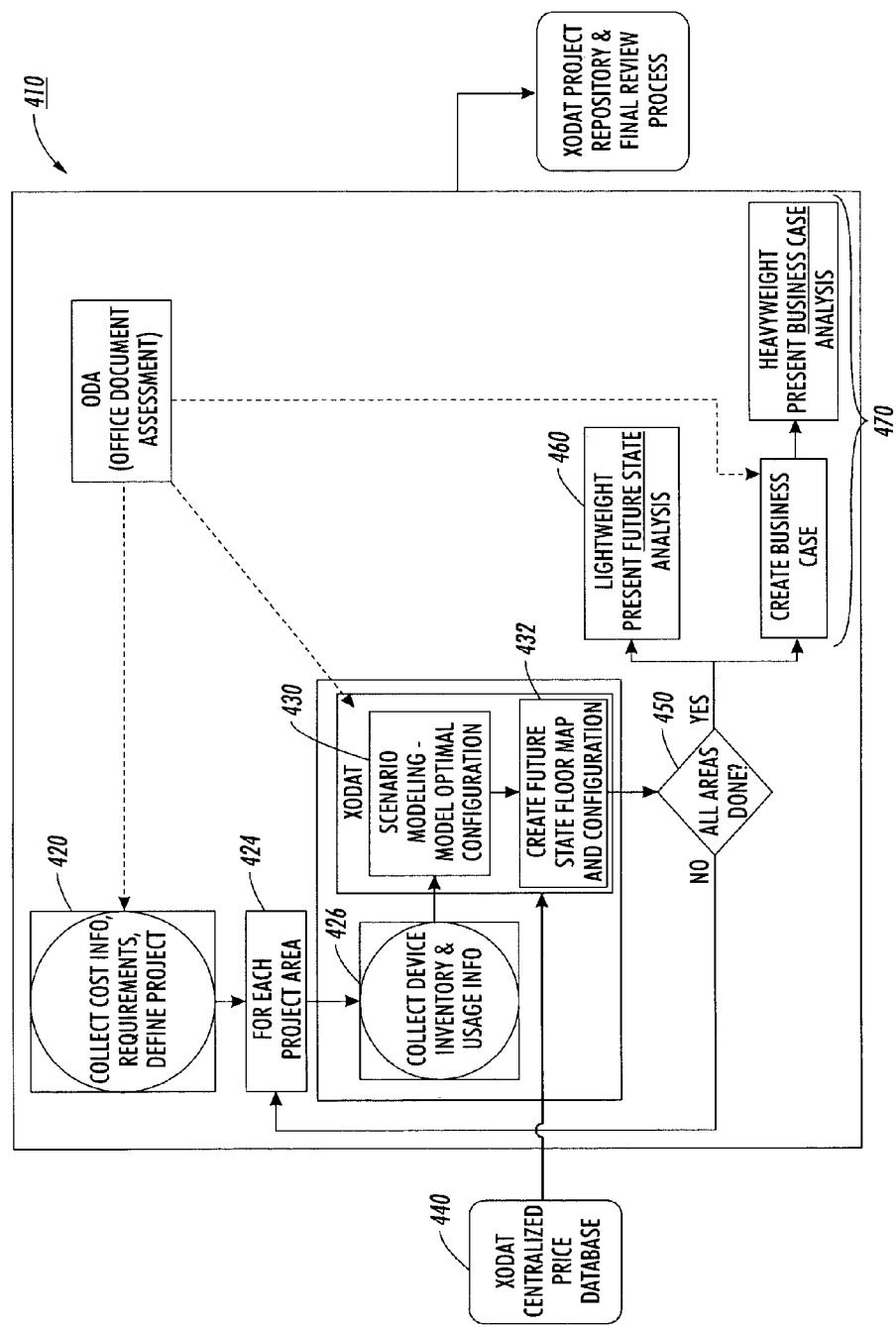
FIGS. 4 and 5 illustrate exemplary flowcharts for the method disclosed herein.

From FIG. 4 it is apparent that the ODA application may be employed in two contexts, "lightweight" and "heavyweight" the outcomes of the basic ODA workflow 410; these contexts illustrate how ODA meets differing customer needs. Perhaps the most "lightweight" use of ODA is to define the placement of MultiFunction Devices (MFD) for a customer who has already been sold on their cost-effectiveness—where no business case analysis or comparison of current state and future state costs are required. At the other extreme, the "heavyweight" context, the customer must be shown the costs of the current operating state and the benefits of the proposed configurations. In the "heavyweight" analysis, much more work is required; detailed costs must be gathered and validated with the customer and a business case built comparing the cost-effectiveness of the current and future states. The business case is a significant part of the "heavyweight" analysis.

The ODA project complexity depends on what the customer wants to have demonstrated by the results. The ODA application helps gather information from and about the customer needs and environment and will help a user define the required scope of the ODA project and analysis. ODA requires customer-specific information for the analysis, and where none is provided defaults may be used. The extent of the customer information collected and number of areas analyzed depends on the results (i.e. metrics and calculations) that must be presented. The ODA workflow or method shown in FIG. 4 starts-with the step of collecting customer requirements and information 420, which are gathered and used to define the project.

Once the basic customer information is gathered and the project defined, step 424, the bulk of the project consists of gathering device (asset) information, which consists of inventory and usage information as represented by step 426, then modeling an optimized configuration for each area as represented by steps 430 and 432. The inventory information describes the asset and its location, which is specified using a gridded floor map (e.g., FIG. 9), and associates pricing information from the price database 440. The inventory step 426 measures asset output volumes at the beginning and end of an observation period to define the usage volumes of the assets. The period volumes are extrapolated into an average monthly volume for all assets. Next, cost and utilization metrics are calculated for the area and individual asset being analyzed. Once these metrics and customer requirements are gathered by ODA, as determined at step 450, they are used to guide decisions during scenario modeling. Scenario modeling is used to generate the optimal configuration as represented by the "lightweight" or "heavyweight" steps 460 and 470, respectively. Once all areas are analyzed the customer is presented with either an analysis of the Current and Future State Presentation Reports (lightweight) or a Business Case (heavyweight), depending on the project goals. The implementation costs for all services and hardware determined necessary to fulfill the customer requirements uncovered by ODA are included in the business case 470.

The ODA application and methodology are supported by a centralized models database 440, where the latest model and consumable specifications and prices are made available. The specialist can request updates to the centralized models database when new models (i.e. not already in database) are found. At the conclusion of the project, completed project data is uploaded into a centralized repository.

The goal of the ODA process is to help a customer save money in their office output environment and to show how that savings would be achieved. The ODA, therefore, models operating costs of a reconfigured (future state) office output environment—one suitable for meeting the measured volumes. The business case generated from the current (i.e. "initial") and proposed (i.e. "future") state presentation reports illustrates the cash flow differences, considered over several years, of the two scenarios. Continued operation in the current mode is compared to operating in the proposed (or "future") state. The business case clearly demonstrates the benefits of the proposed configuration defined in the future state presentation report.

Figure 5:
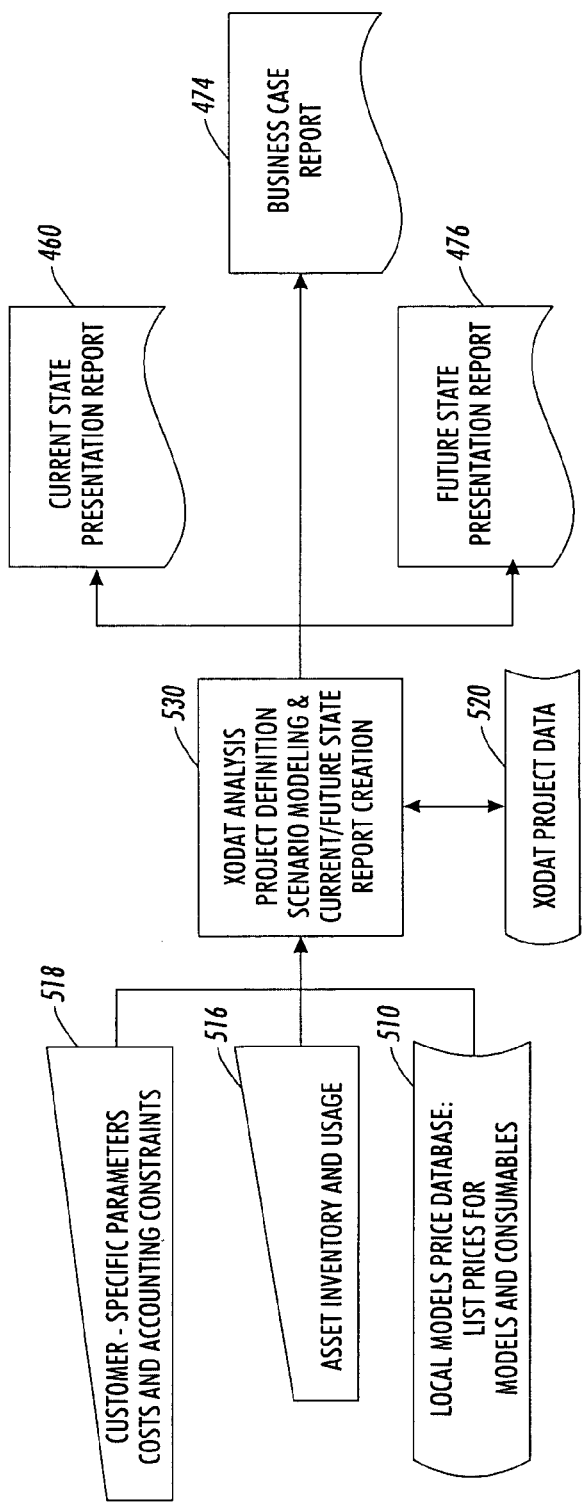

Turning now to FIG. 5, the various software components of the ODA tool are depicted relative to the associated data. Data stores 510 and 520 represent application-specific data files or databases, which are provided to the analysis "engine" 530 in the office document analysis tool. Areas 516 and 518 are customer-, project- and asset-specific information required by for the analysis. As briefly discussed with respect to FIG. 4, reports 460, 474 and 476 are generated by the ODA application (Current State 460, Future State 476) and the Business Case 474 analysis (Business Case Report).

ODA assess various aspects of operating cost associated with output devices in the customer environment. These costs are used in the business case 474. Various dimensions of operating cost are summarized in the metrics (e.g. cost/employee, monthly hard cost . . . ) reported for the various cases/reports, and the reports may be partitioned to illustrate the various breakdowns as depicted, for example, in FIG. 6. As indicated in FIG. 6, the system is based on a hierarchical structure, which has the project 610 as the topmost point, below which the project elements or collections 630 (e.g., buildings) are arranged in a tree structure that is similar to the element's physical relationships. At the very end of the hierarchy are Areas 640, where maps and Assets are collected. For Scenario Modeling purposes, Areas 640 can be sub-divided into zones 650, which define "reasonable" limits within which an optimization makes sense. Imagine, for example, doing an optimization on a floor of a very, very long and narrow building. Considering a long or physically limiting floor for the purpose of an analysis might not be reasonable. The physical limits might preclude reasonable access to some Assets. Hence, physically limiting areas are further subdivided into zones. Not all areas must be subdivided—only those where physical limitations impose unreasonable restrictions on users. The region used (area or zone) to define the optimization space must be one within which doing an optimization makes sense—it should not be too big or too small.

It will be appreciated that an accurate characterization of the client's infrastructure and consumables costs are vital to characterizing cost-per-page. Hence, meaningful information about the client environment, including location is believed to be vital to the usefulness of the ODA calculations performed by the application. Such information may include: (a) Client costs and discounts; (b) Inventory-Asset (by device model) and location. This information may further include: (c) Asset volumes (e.g., the number of pages printed per month and type of output (copy, print, fax, B&W, color . . . ), used to determine monthly operating cost and device utilization; (d) Device and lease costs, to define monthly expenditures; (e) Consumables costs, to define monthly operating costs, and (f) Representative areas in analysis (i.e., when the study is to be extended to predict broader, enterprise-wide, savings the areas in the study must be representative so that the results may be extended).

The Business Case Report 474 generated by the ODA summarizes the Current and Future State costs available within the ODA analysis. All remaining business case data must come from the overall Office Document Assessment. The business case report is, preferably, generated after all areas 640 and zones 650 have been optimized, although it may also be possible to perform partial optimizations on certain collections 630 or areas 640 within a project (e.g., where optimization criteria may be altered for different collections or areas).

The business case projects the costs of operating the customer's output environment over a period of successive years. The business case generates projections using the current and future (proposed) state produced by ODA. The future state projections should show a reduced cash flow (a savings for the customer) for a successful optimization. The business case is used to make a compelling justification, based on cost savings, to the customer for the proposed configurations and services.

Having described the general operation of the ODA application (system and method), attention is now turned to FIGS. 7-13, to provide further description of the ODA application. FIGS. 7A, 7B, and 8-10 are illustrative representations of information within a project database in accordance with the system and method disclosed. Referring to FIG. 7A, the ODA screen 700 is composed several panels and a navigation bar along the top. The panels of the window depicted in FIG. 7A include: (a) Navigation Panel 708, which displays the project hierarchy and allows selection of current and proposed scenarios and specific enterprises and locations within them; Info (Information) Panel 710, for displaying a variety of information about currently selected items and provides data entry fields for a user to enter or update project data; (c) Main Panel 712 which displays listing of Collections, Areas, Zones, and Assets, or displays maps; and (d) Resource Center Panel 714, which Displays available Models, Consumables, Recycled Assets (Proposed Scenario only), and Warnings. The specific information displayed in the panels varies according to the tasks currently being performed. The Project, Info, and Resource Center panels have multiple tabs that are used to select the information that is to be displayed in the panel. The Navigation panel 708 of the ODA user interface is located in the upper-left corner of the screen. It provides a drop-down box for selecting either the Current State or a Proposed State Scenario, and a folder-style (hierarchical) navigation tree from which Projects and their associated components may be navigated. After a Project has been opened, it will be displayed at the top of the Navigation Panel. As will be appreciated, the folders on the navigation tree in panel 708 may be are expanded either by selecting the [+] box before closed folders or by double-clicking on them. Similarly, selecting the [−] box will collapse a folder display. As the Project, Collections, Areas, and Zones are opened by selecting on them, attributes about them will be displayed in the Main Panel as well as in the Info, and Resource Center panels. The Resource Center Panel 714 is located in the lower-right corner of the ODA screen. The four tabs that are used to specify what is displayed in the Resource Center Panel include: Models (displays models that are available for placement in an Area or Project); Consumables (supplies that are on hand and available for assigning to a Model); Recycled Assets (displays assets that have been removed from one location and are available for reassigning elsewhere—Proposed Scenario only); and Warnings (displays ODA-generated warnings concerning the currently active scenario).

Figure 7A:
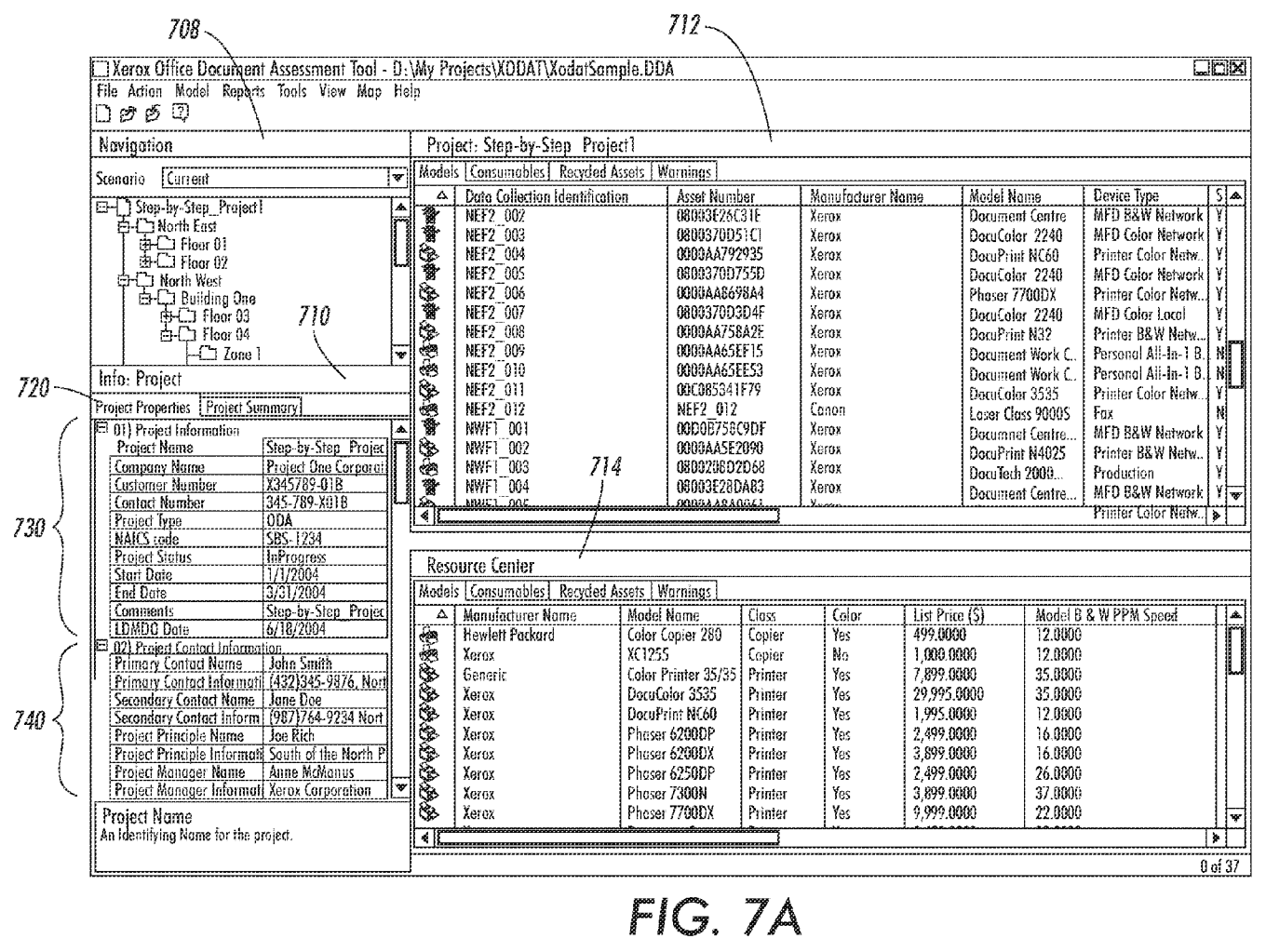
Figure 7B:
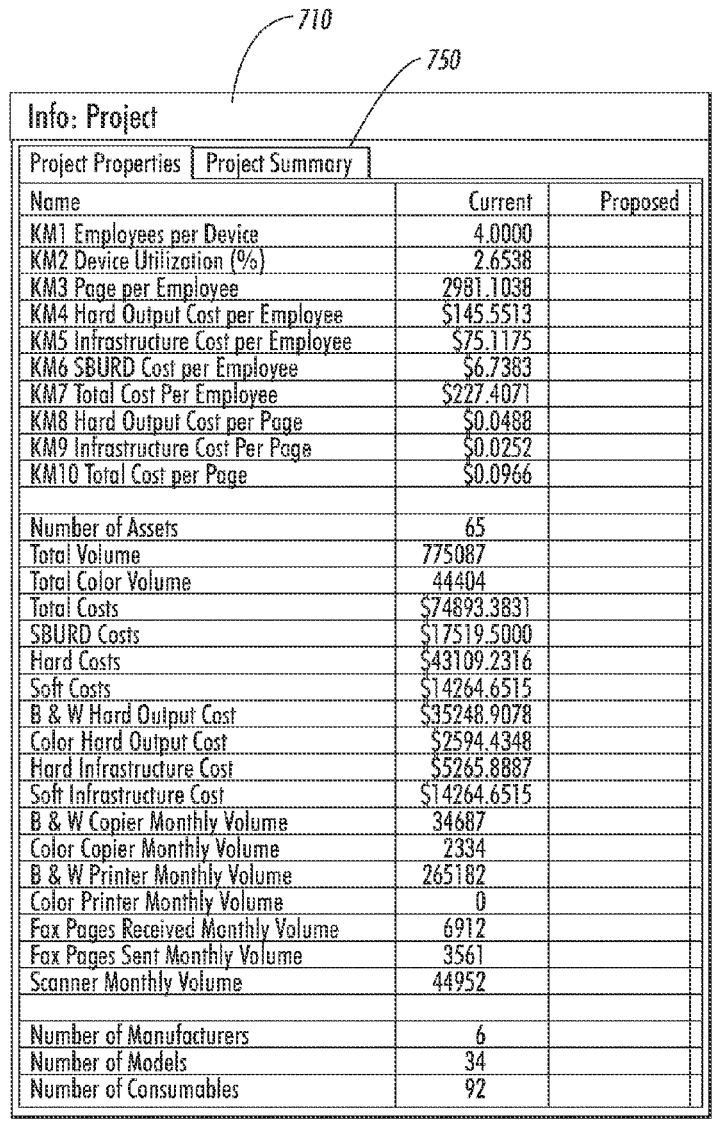

Referring also to FIG. 7B, there is illustrated a project info panel 710. In window 710, there may be displayed one of two tabs, project properties 720 and project summary 750. In FIG. 7A, project properties tab 720 is illustrated, where project information region 730 and project contact region 740 each include a plurality of fields with information relevant to a specific project. In FIG. 7B, the project summary tab 750 displays within window 710 a summary of the data entered and calculated relative to a particular project. It will be appreciated that the project information displayed in both windows 710 is entered and stored in the project database 124 as described above relative to FIG. 1.

Referring next to FIG. 8, there is illustrated another exemplary (partial) view of a Main Panel 712, with a list of the various assets that may have been identified or associated with a project. In particular, the ODA Main Panel 712 may include a listing of various assets identified by an asset number in column 820, and also including one or more additional columns 830 showing characteristics of the assets (e.g., manufacturer, model, device type (e.g., printer, multi-function, color, B/W, etc.). As noted with respect to FIGS. 7A and 7B, the data displayed in window 810 would be data that is stored within the project database (some of the data may have been imported from the model database based upon entry of manufacturer/model name information). When an area or a zone is selected from the Navigation Panel 708, there will be a Map tab displayed within the Main Panel 712. As example of such a display is shown in FIG. 9.

Figure 9:
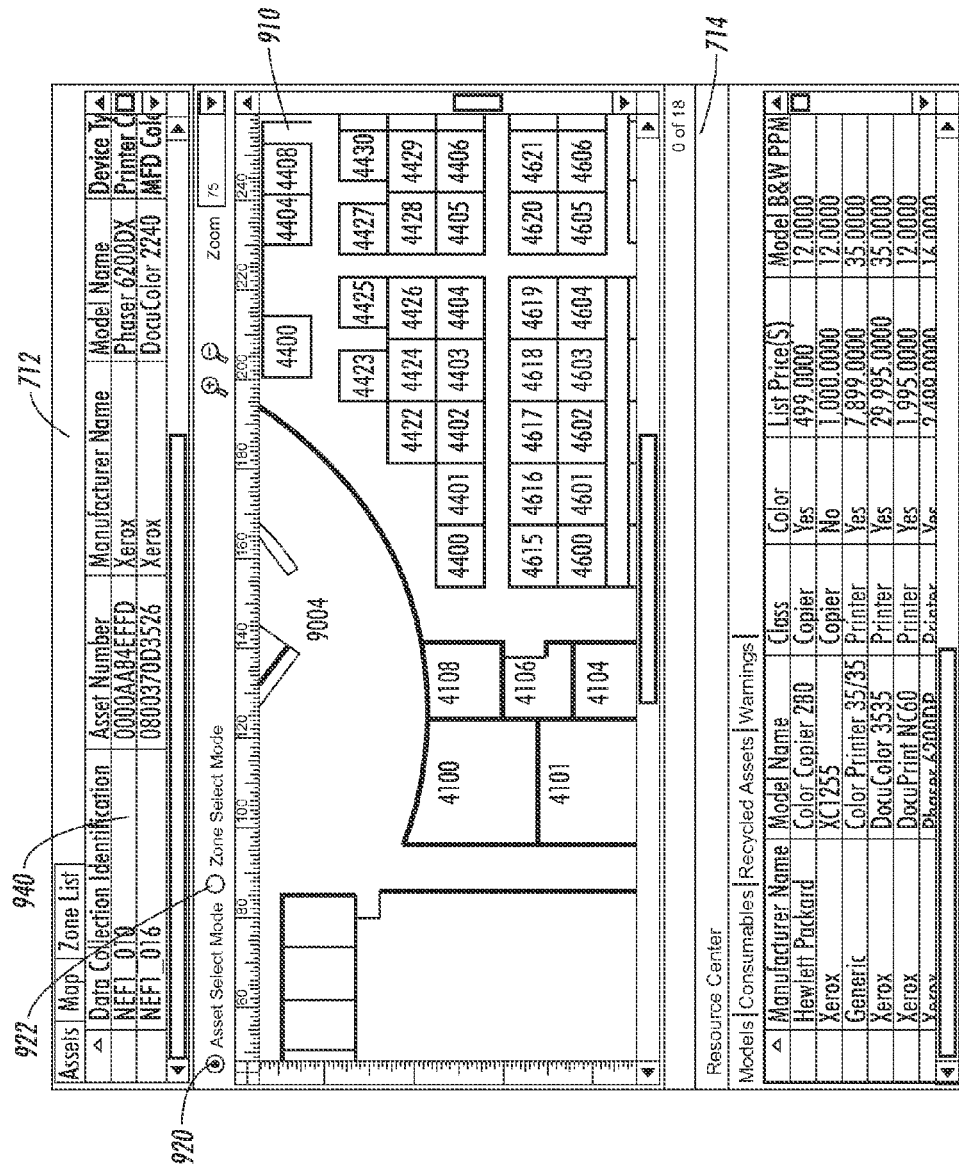

Referring also to FIG. 9, there is displayed a partial view of an ODA interface, where the Main Panel illustrates a map 910. Although it is anticipated that the customer can provide electronic of floor maps for areas to be analyzed, it is also contemplated that such maps may be produced from hard-copy documents, which are digitized and stored, and then a grid and asset placement information may be imposed or overlaid thereon. Printed and gridded versions are used to specify Asset location during inventory gathering. During Scenario Modeling, Assets are manipulated and the floor map is used as a guide for Asset placement. Floor maps are stored in the ODA's project database, and are associated with an area. Floor maps may also be printed to show the Current or Future State Asset locations. Another aspect of the system contemplates the exporting of the maps (with overlays) to Microsoft Visio or similar software for further refinement. The Current and Future State floor maps, as partially represented in region 712 are typically included in the Final Report.

As further illustrated in FIG. 9, the map may be used to identify particular zones relative to the map. For example, the left-most zone is depicted in a color that is different from the right-most zone. The boundaries of the zones, as indicated above, are employed to define those regions in which users would typically access a particular asset. In other words, a larger, high-speed printer may be used by a work-group and the region on the map associated with such a device may be represented as a zone. As indicated by radio buttons 920 and 922, the map may be used in at least two different modes, where one is used to place and edit the zone boundaries while the other is used to place and alter the assets (depicted above the map in region 940).

Turning now to FIG. 10, depicted therein is an exemplary user interface panel 1010 illustrating some of the various defaults that are employed for a particular project. The following tables illustrate aspects of the project defaults as defined by the various tabs (1020, 1022, 1024, 1026 and 1028) and it will be further appreciated that the defaults may be modified relative to a particular project. The advantage of the defaults is that such information may be cascaded and applied throughout the project without having to manually enter the information for each asset, zone, area, etc.

TABLE A1

Project defaults: Cost by Page Contracts (Tab 1020)

| Project Defaults: Cost by Page Contracts | Description |
|---|---|
| Contract Name | Unique identifier for Cost by Page Contract |
| Contract Type | Equipment, Supplies, or Service Contract |
| Contract Provider | Name of Service Provider |
| Monthly base cost | Monthly base cost on the contract |
| Supplies included | Whether supplies are included in base cost |
| B&W plan volume allowance | B&W pages printed beyond this number are charged at the "excess cost per page" below |
| B&W Plan excess cost per page | Charge for number of pages in excess of plan allowance |
| Color plan volume allowance | Same as B&W plan volume allowance but for color page |
| Color plan excess cost per page | Same as B&W plan excess cost per page but for color page |

TABLE A2

Project defaults: Model Class Management parameters (Tab 1022)

| Project Default: Model Class Management | Description |
|---|---|
| Model Class Name | Categorization of the class of output device. Options include: all-in-1, copier, fax, printer, scanner, mainframe, MFD, other, production, scanner, and special application |
| Equipment Discount | Percentage discount to apply to equipment list price (Models Table) |
| Supplies Discount | Percentage discount to apply to supplies list price (Consumables Table) |
| Equipment Refresh Rate | Number of month's equipment is used before being replaced; used to calculate monthly operating cost. Only has effect when "include depreciation" is set in Include Costs Profile. |
| Target utilization lower limit | Lower limit on utilization (optional) |
| Target utilization desired value | Average expected value of utilization (optional) |
| Target utilization upper limit | Upper limit on utilization (optional) |

TABLE A3

Project defaults: Device Types Management (Tab 1024) to include (Device Types Management specifies which costs or factors to include in calculations)

| Project Default: Device Types Management | Description |
|---|---|
| Device Type | Device Type is an Asset attribute based on Model Class, Is Model prints in Color, and if Asset is networked |
| Class | Relates back to Model Class used for Device Type |
| Count | XODAT will only count Assets where count is enabled for that Device Type. Except when an Asset's Count settings has been set by user. |
| Cost | XODAT will only include an Asset's costs only when cost is enabled for that Device Type. Except when an Asset's Cost settings has been set by user. Count must be enabled, before Cost can be enabled. |

TABLE A4

Project defaults: Project Include Costs (Tab 1026) (Specifies which costs to include in calculations)

| Project Defaults: Include Costs Profile | Description |
|---|---|
| SBURD | Shop, Buy, Use, Re-deployment, and Disposal |
| Include Enterprise Help Desk Costs | Include Enterprise help desk related costs in SBURD calculation, otherwise they are not included in operating cost calculations. |
| Include Enterprise Processing Costs | Include Enterprise purchase order and invoicing related processing costs in SBURD calculation, otherwise they are not included in operating cost calculations. |
| Include Enterprise Other Costs | Include other Enterprise related costs in SBURD calculation, otherwise they are not included in operating cost calculations. |
| Include Enterprise Wage Costs | Include Enterprise wage related costs in SBURD calculation, otherwise they are not included in operating cost calculations. |
| Hard Output | Equipment, Service, Supplies |
| Include Equipment Contracts Costs | Include Equipment Contracts costs in hard output and Hard cost calculation, otherwise they are not included in operating cost calculations. |
| Include Depreciation Costs | Include depreciated value of device in its monthly cost in hard output and Hard cost calculation, otherwise they are not included in operating cost calculations. |
| Include Post - Depreciation Costs | Include monthly depreciated value of device cost after it has been fully depreciated, otherwise they are not included in operating cost calculation. This value is an estimator of refresh costs (i.e. costs allocated monthly to purchasing new equipment). |
| Percent of Post - Depreciation Costs | Use only a percentage of the monthly Post - Depreciation Cost. |
| Include Supplies Costs | Include supplies costs in hard cost calculation, otherwise they are not included in operating cost calculations, otherwise they are not included in operating cost calculations |
| Include Service Costs | Include service costs in hard cost calculation, otherwise they are not included in operating cost calculations, otherwise they are not included in operating cost calculations |
| Infrastructure | Phone, Network, Power, Space, Support, Additional |
| Include Phone Costs | Include phone costs in Hard and/or Soft cost calculation, otherwise they are not included in operating cost calculations |

TABLE A4-continued

Project defaults: Project Include Costs (Tab 1026)
(Specifies which costs to include in calculations)

| Project Defaults: Include Costs Profile | Description |
| --- | --- |
| Include Network Cost | Include Network costs in Hard and/or Soft cost calculation, otherwise they are not included in operating cost calculations |
| Include Power Cost | Include power costs in Hard or Soft cost calculation, otherwise they are not included in operating cost calculations |
| Include Space Cost | Include space costs in Hard or Soft cost calculation, otherwise they are not included in operating cost calculations |
| Include Support Cost | Include support costs in Hard or Soft cost calculation, otherwise they are not included in operating cost calculations |
| Include Additional Costs | Include additional costs in Hard and/or Soft cost calculation, otherwise they are not included in operating cost calculations |

TABLE A5

Project defaults: Assessment Management (Tab 1028)

| Project Defaults: Metering Mode | Description |
| --- | --- |
| Single Meter Mode | When selected, XODAT will attempt to normalize the Assets volume based on a single Meter Read and the Assets Purchase Date or Manufacture Date. If the Asset has two or more meters reads then XODAT will use Dual meter mode to normalize volume. |
| Dual Meter Mode | When selected, XODAT requires that an Asset have at least two Meter Reads before it can normalize an Assets Monthly Volume. |
| Analysis Date | This is the Fixed Date used to determine when the Analysis occurred. All date-based calculation will be based on this data. So the Number of months remaining on a depreciating asset or an Equipment contract will be based on this data and NOT the Project End Date. |

Figure 11A:
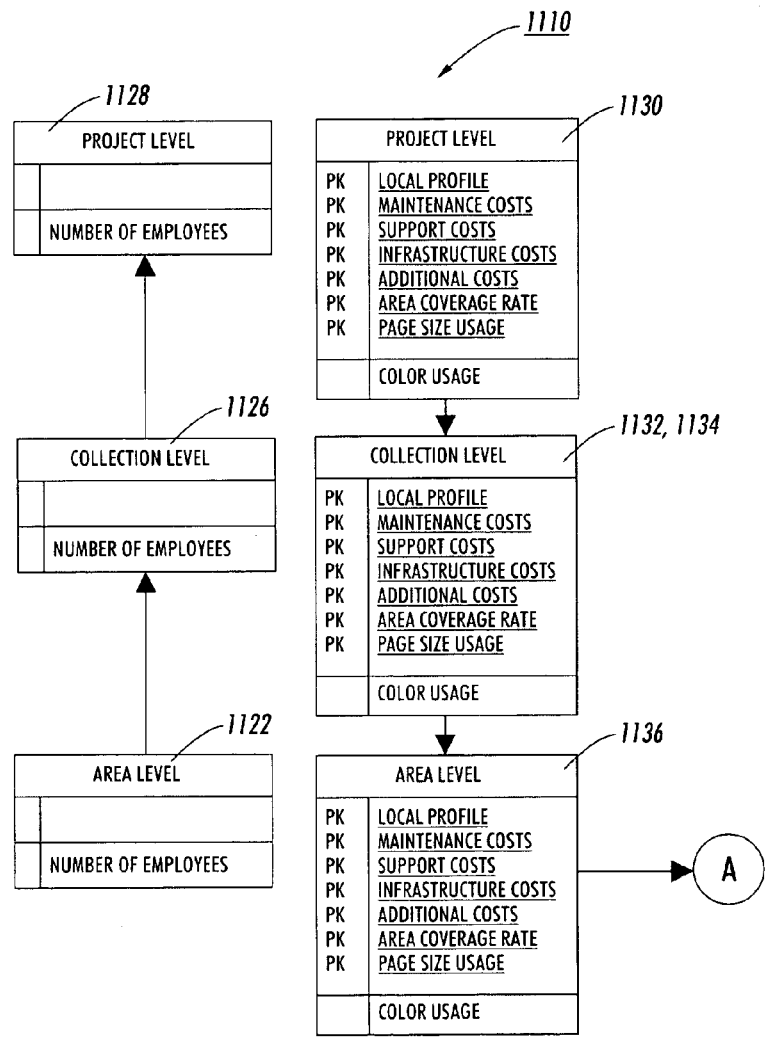
FIGS. 11, 12A and 12B are illustrative examples of a database schema as employed in accordance with the system described herein.
Figure 11B:
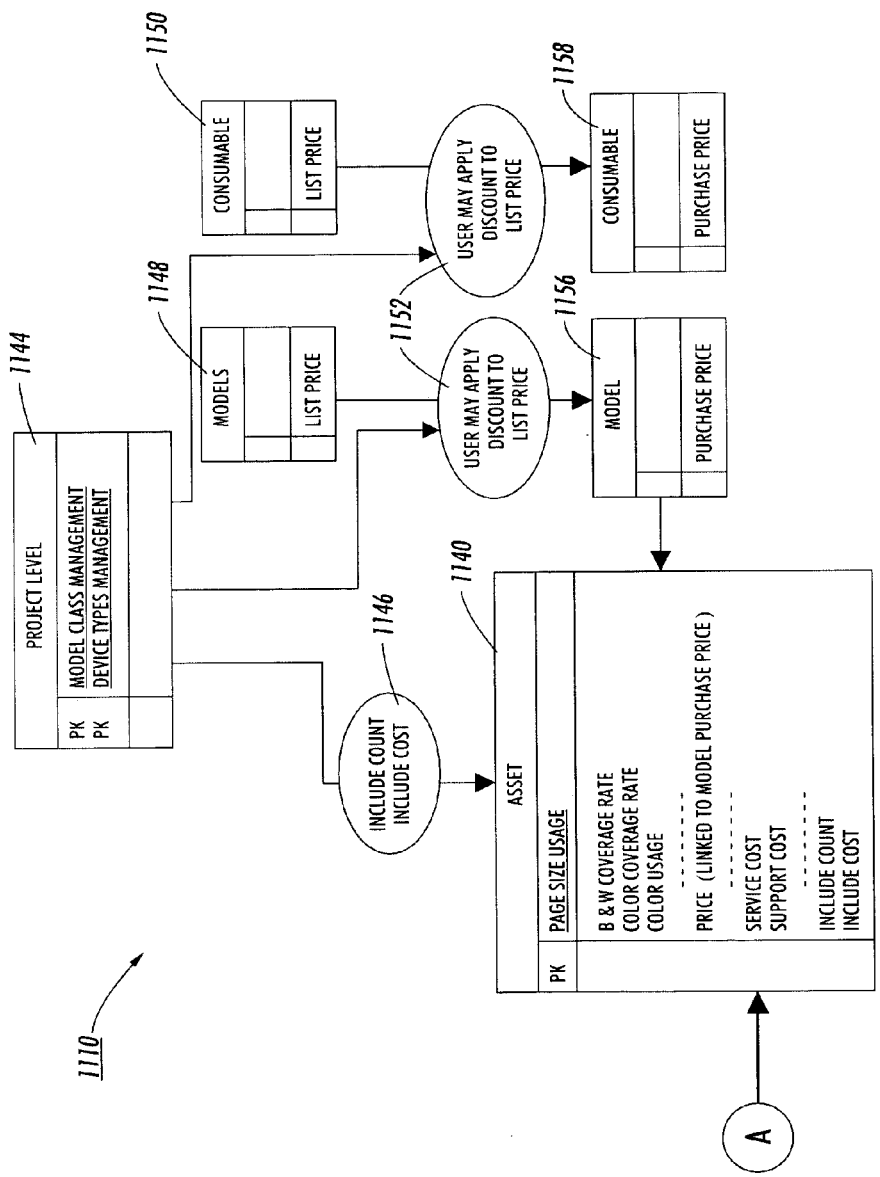
Figure 12A:
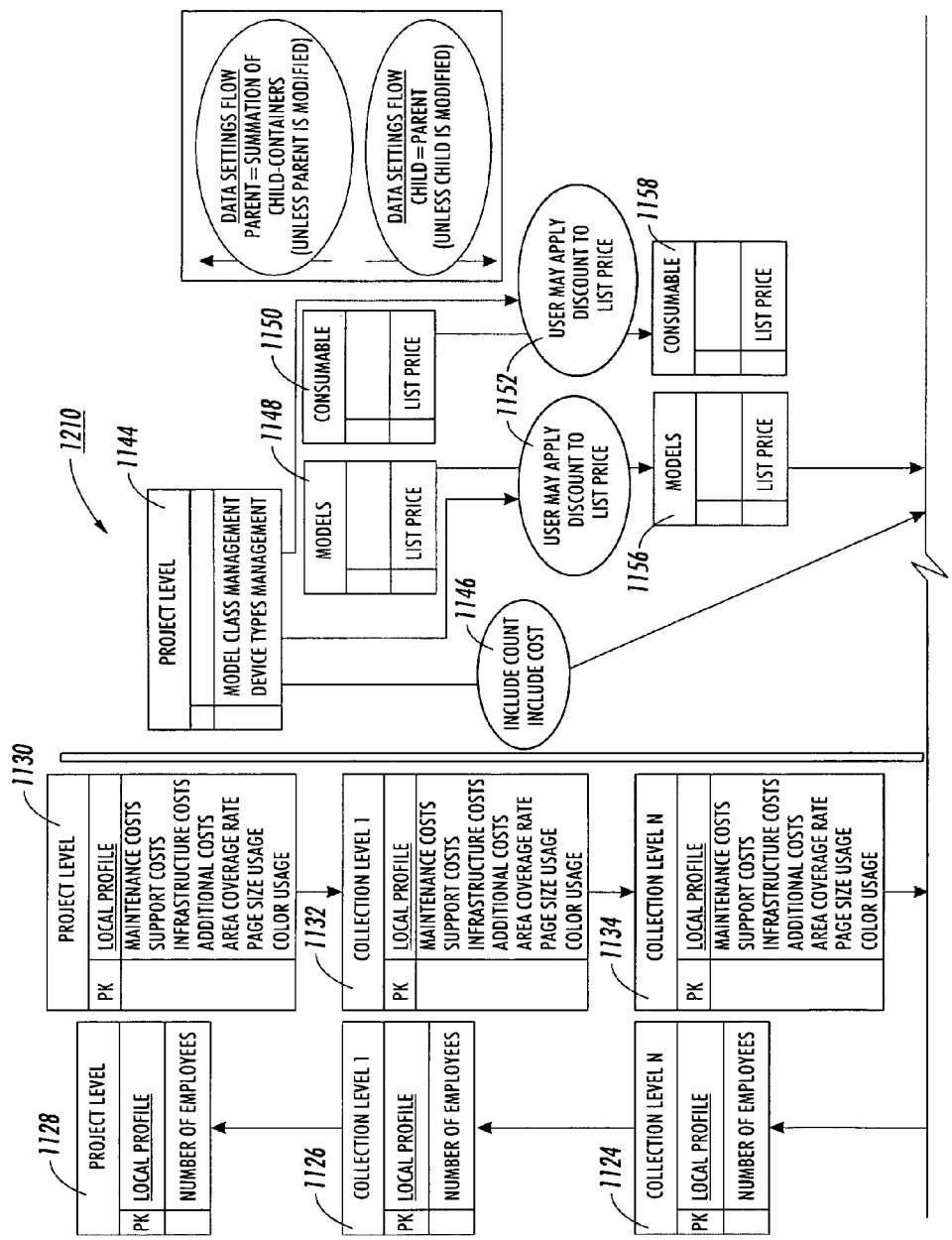
Figure 12B:
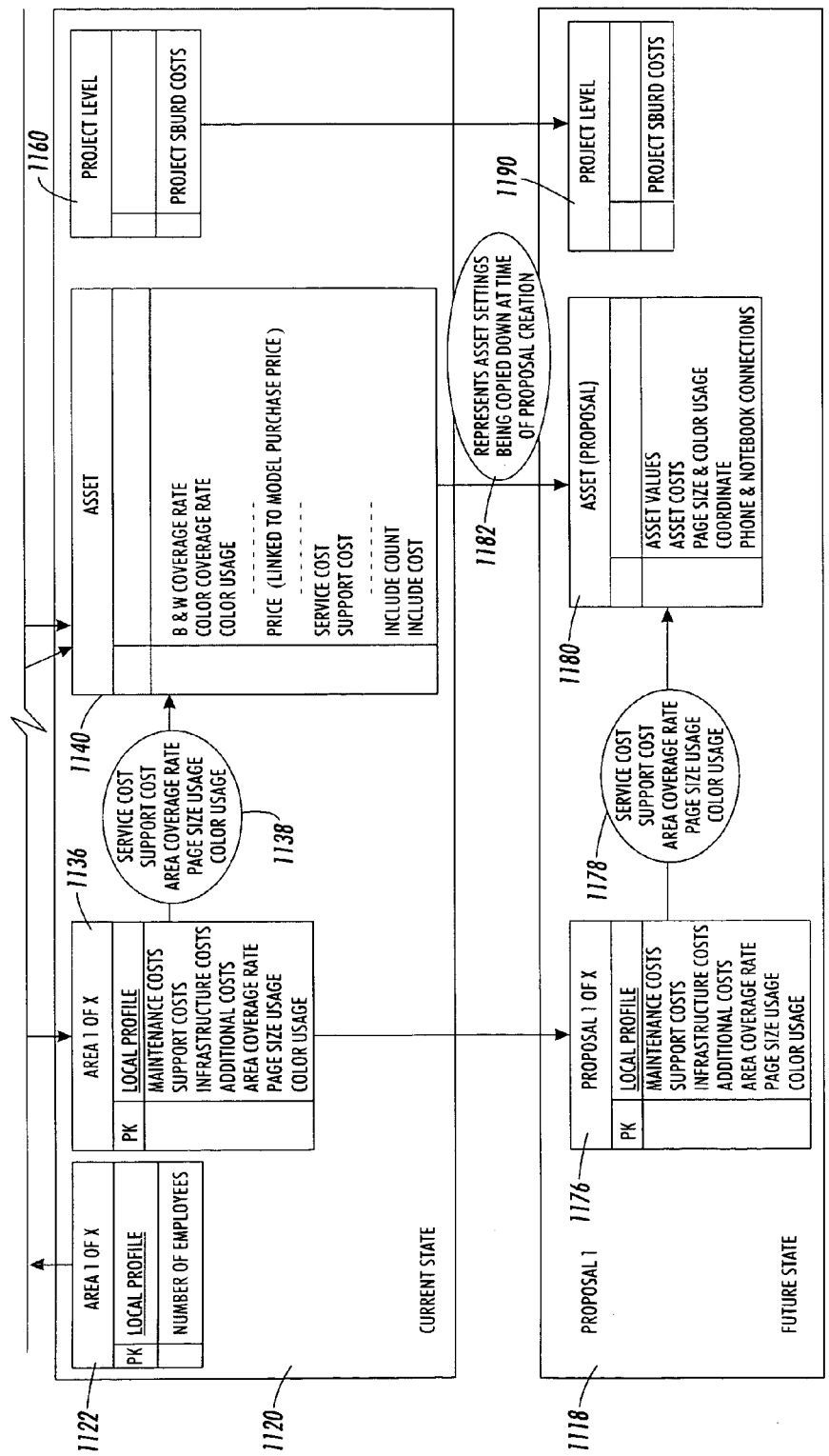

FIGS. 11 and 12A-12B are illustrative examples of a database schema and data flow diagrams as employed in accordance with the ODA system described herein. FIGS. 12A-B is a slightly more comprehensive view of the diagram of FIG. 11. As displayed, the ODA system supports determining the cost of operation using a hierarchical approach as represented in data flows 1110 and 1210. Initially, in assessing the current state 1120, the local profiles 1122 for one or more regions are collected and entered into the database, and are fed upward through the collection levels 1124 and 1126, and then to the project level 1128. In a similar manner, the project data, particularly including default data such as maintenance, support and infrastructure costs, is set at a project level 1130 and distributed to the collection levels 1132, 1134 and area level 1136. The composite area-level data is used at the current state level as input 1138 to the asset model, where the various known costs and data are applied to the asset model 1140. A similar operation is performed relative to the alternative (optimized) proposals as depicted at level 1118. Also input to the model 1140 are the Model class and device type data 1144, based upon the costs inclusion variables as represented by 1146. Similarly, model 1148 and consumable 1150 data (pricing) is provided to the model, with the appropriate discounting (1152), if applicable to produce the discounted consumable and asset pricing data, 1158 and 1158, respectively. Once all required data is available (that not available may be estimated or taken from default usage/model data), the current state may be characterized using the model 1140 and a project-level cost/usage analysis may be completed 1160.

As described above, the ODA uses cascading properties to decrease the amount of effort needed to keep all of the properties in a project up-to-date. When properties are entered in at one level they will be cascaded or passed down to lower levels and ultimately end up affecting the asset. As you can see from FIGS. 11 and 12, a user can enter in properties for the project and those properties will be cascaded down through the levels of the Project. In addition, in some cases all the way to the asset. At any point, the user may override a property and enter in a new value. Then, that value will be cascaded below. The advantage of this approach is that it reduces the number of times a user has to enter in a property. Set it once at the top level and then only change it at the levels where it needs to be different. From the Project Level all properties, with the exception of Number of Employees, are cascaded down to the next level. The Number of Employees should be set at and for each Area then that value is summarized for that level and cascaded up. At the Project level, the total sum of employees is displayed.

As contemplated by the ODA system, there are the Project Defaults, which in some cases affect the Models Properties and in other are directly tied into the asset. For example, as described relative to model 1148 and consumable 1150 data (pricing) and discounting (1152), when a discount is first applied it will be applied to the model and consumables list price resulting in a Discounted Purchase Price. This Purchase Price is then cascaded to each Asset using that model. If the Model's Purchase Price is overridden, that value will be cascaded down to the Asset's Purchase Price, and the Model will no longer accept the Discounts from the Project Defaults. Furthermore, if the Asset's Purchase Price is overridden, the Asset will no longer accept the value cascaded from the Model.

Similarly, relying on project-level data, and revisions made relative to the proposal (including re-allocation of assets, new/replacement equipment, etc.), the future state is prepared. Again, the usage and cost information is input to the model, by but in this case, the area or zone information reflects alternatives that may be different from the current state. Model 1180 is then employed to provide data for a project-level cost/usage analysis 1190.

As set forth in the following tables (B1-B9), the ODA system stores and provides various parameters for use in the office document analysis process. As will be appreciated the "entire" cost of an office document environment includes not only the direct equipment and supplies costs, but also includes indirect costs associated with operating (electricity, floor space), maintaining (service, replacement parts) as well as costs for handling billing and payment for such equipment. As will be appreciated, the following tables include parameters that are reflected in the project database 124.

TABLE B1

Enterprise SBURD Parameters

| Enterprise SBURD Parameters | Description |
|---|---|
| SBURD Enterprise (12) | Shop, Buy, Use, Redeploy and Dispose |
| Number of Enterprise Employees | The Number of Employees within the Enterprise for which the following numbers apply. |
| Help Desk Costs (13) | |
| Help Desk Call Cost | Cost for average help desk call |
| Total Help Desk Calls | Total number of help desk calls (including output-related) |
| Output-related % of HD calls | Fraction of all help desk calls that are related to output devices |
| Processing Costs (14) | |
| PO Processing Cost | Cost of processing (an output-related) purchase order |
| Invoice Processing Cost | Cost of processing (an output-related) invoice |

TABLE B1-continued

Enterprise SBURD Parameters

| Enterprise SBURD Parameters | Description |
|---|---|
| Number of Equipment Purchase Orders | Number of output-related purchase orders processed per month |
| Number Equipment Invoices | Number of output-related equipment invoices processed per month |
| Number Supplies Invoices | Number of output-related supplies invoices processed per month |
| Number Service Invoices | Number of output-related service invoices processed per month |
| Other Costs (15) | |
| Other 1 SBURD Costs | Other SBURD monthly costs |
| Other 2 SBURD Costs | Other SBURD monthly costs, not included above |
| Annual T&M SBURD Costs | Annual Enterprise Time & Materials expanse |
| Wage Costs (16) | |
| Manager Wages | Hourly wage for average manager |
| Manager Billable Hours | Number of manager-hours devoted to output-related matters |
| Administrator Wages | Hourly wage for average administrator |
| Administrator Billable Hours | Number of administrator-hours devoted to output-related matters |
| Professional Wages | Hourly wage for average professional |
| Professional Billable Hours | Number of professional-hours devoted to output-related matters |

TABLE B2

Project Parameters

| Project Parameters | Description |
|---|---|
| Local Profile (3) | |
| Employees | Number of Full Time employees in the locations where an Asset inventory was conducted. Typically, this number will only be entered in at the Area level with the Project level being the sum of all areas. |
| Work Hours per Day | The number of hours in a workday; typically this number is some multiple of 8 |
| Work days per week | The number of days in an client workweek; this number is either 5 or 7 |
| Additional non-work days | This is the number of days that otherwise would be workdays, but are non-working (i.e. holidays). For example, for a company with a 5 day work week when employees have off a normal workdays due to a national holiday. |
| Maintenance Costs (4) | These monthly costs are applied to each model class |
| Service cost <Device Class & Other> | Monthly per-asset (Hard Output) service cost |
| Support Cost (5) | |
| Support Cost | Monthly per-asset help desk support cost |
| Infrastructure Costs (6) | Monthly costs are applied for specific infrastructure items that support output device operation |
| Local Power Cost | Cost per kilowatt-hr for power in local currency |
| Office Space cost per sq-ft (monthly) | Monthly cost per square-foot for office space |
| Office space cost per sq-m (monthly) | Monthly cost per square-meter for office space |
| Monthly Phone Line Cost | Monthly hard phone cost per line |
| Monthly Phone Infrastructure Cost | Monthly soft phone cost per line |
| Monthly Network Drop Cost | Monthly hard Network cost per drop |
| Monthly Network Infrastructure Cost | Monthly soft Network cost per drop |
| Additional Costs (7) | Additional monthly cost applied per device |
| Additional hard costs | Other monthly hard costs |
| Additional hard costs description | |
| Additional soft costs | Other monthly soft costs |

TABLE B2-continued

Project Parameters

| Project Parameters | Description |
|---|---|
| Additional soft costs description | |
| Area Coverage Rate (8) | Area coverage rates by device class |
| Coverage rate BW <Device Class> | Area coverage for B&W documents produced by specified device class |
| Coverage rate Color <Device Class> | Area coverage for Color documents produced by specified device class |
| Paper Size Usage (9) | Estimate the distribution of paper sizes used throughout project. Printing on larger paper sizes uses more consumables and costs more. |
| % Paper Size used US Letter | Fraction of jobs printed on 8.5 × 11" paper (typical US size) |
| % Paper Size used US Legal | Fraction of jobs printed on 8.5 × 14" paper |
| % Paper Size used Tabloid | Fraction of jobs printed on 11 × 17" paper |
| % Paper Size used A4 | Fraction of jobs printed on 210 × 297 mm paper (typical size outside US) |
| % Paper Size used A3 | Fraction of jobs printed on 297 × 420 mm paper |
| % Paper Size used B4 | Fraction of jobs printed on 257 × 364 mm paper |
| Color Usage (10) | |
| Color Volume Usage Rate | Percentage color printer pages printed in color (remainder is B&W) |

TABLE B3

Local information (building and contact information)

| Location-specific Parameters | Description |
|---|---|
| Customer Number | Enter Xerox assigned customer number |
| Business use | Categorization the location or the department (e.g. HR, Marketing, corporate, legal . . . ) |
| Building ID | Building/Area name or number |
| Floor | Identifies floor |
| Address 1 | First line of Address |
| Address 2 | Second line of Address if needed |
| City | City Name |
| State/Providence | State/Providence |
| Zip/Postal Code | Zip/Postal Code |
| Country | Address Country Name |
| Primary Contact Name | Contact's Name |
| Primary Contact Information | Contact's information {phone number, email address, address, City, State/Providence, Zip} |
| Secondary Contact Name | Contact's Name |
| Secondary Contact Information | [Contact's information {phone number, email address, address, City, State/Providence, Zip} |

TABLE B4

Collection Profile Parameters

| Collection Information | Description |
|---|---|
| Collection name | Name of collection; e.g. Building 1 or Campus Sunny |
| Collection description | Description of collection; e.g. Middle four floors of Bldg A; or all administrative areas on Sunny Campus |
| Comment | Descriptive comment about collection; e.g. building contains senior executive offices; output handled by administrators; cannot remove any personal devices, but can redirect some volume to network devices |

TABLE B5

Area Profile Parameters

| Area Information | Description |
|---|---|
| Area name | Name of area; e.g. Floor 1 |
| Area description | Description of area; e.g. Administrative floor |
| Comment | Descriptive comment about area; e.g. Marketing department; heavy use of color for presentations; demand is greatest near end of quarter, triple usual monthly volume |
| Area status | Categorization of the Area's Assessment status. Options; In Process, Optimized Pending Review, or Optimized |
| Floor map | Select button to Add or change Map image. This map will then be displayed as the Map surface in both the Area's Map view and the Zones Map view. (Formats: BMP, JPG, or GIF) |

TABLE B6

Zone Profile Parameters

| Zone Information | Description |
|---|---|
| Zone Name | Name of Zone, group or division name |
| description | Description of zone |
| Outline Color | The translucent color of the Zone when looking at the Map, options; Black, Gray, Purple, Violet, Brown, Light Brown, Green, Light Green, Blue, Light Blue, Red, Orange, Pink, Yellow. |
| Transparency | How transparent the Zone box will be. At one-hundred percent, Zone will be completely transparent. A transparency setting of 25% will be the most non-transparent the user will be allowed to go. 75% transparency is the default value. |

TABLE B7

Consumable Parameters

| Consumables Parameters | Description |
|---|---|
| Consumable | |
| Manufacturer | Name of consumable Manufacturer |
| Consumable Name | Consumable Name or Number |
| Consumable Type | The Type of Consumable (fuser, Toner, Cartridge, etc.) |
| Part number | The Number assigned to a product by its Manufacturer for ordering purposes. |
| UPC Number | The Number assigned to a product by its Manufacturer for tracking purposes. |
| Description | A description of the Consumable. |
| Costs | |
| List Price | The List Price of the device. By default, this will be the List Price as recorded in the LMDB. Can be changed by user |
| List Price Source | The source of the Price. Where it was found or the name of the source import field |
| Purchase Price | The customers Price of the device. By default, this will equal List Price. If a Discount is applied it will represent the Discounted price. If the user changes it then it will be the Customer price. |
| List Price updated on | The date that the Price was last updated. |
| Area Coverage at rated life | Used for consumables whose use-rate is based on a percent of toner/ink coverage. |
| Yield | The rated life expectancy of the Consumable. (Yield = # of pages per month at rated coverage) |
| Capabilities | |
| Color Consumable | Show when a consumable is for color imaging. |
| Models compatible with Production | A list of Models that Consumable can be used on. |
| Date Announced | Date when product was announced |
| Date Shipped | Date when product was first shipped |
| Date Discontinued | Date when product was discontinued (i.e. no longer manufactured) |

TABLE B8

Model Parameters

| Model Parameters | Description |
|---|---|
| Model | |
| Manufacturer | Name of Model Manufacturer |
| Model Name | Model name |
| Base Model Name | Base or root Model name |
| User Specified Model | Displays a Yes when the Model was created within the Project, and not imported from the master Models Database. Displays a No when the model was imported from the master Models Database |
| Model Class | Categorization of the class of output device. Options include: all-in-1, copier, fax, printer, scanner, mainframe, MFD, other, production, scanner, and special application |
| Description | Textual description of product |
| Comment | Comments about device. |
| Costs | |
| List Price | The List Price of the device. By default, this will be the List Price as recorded in the LMDB. Can be changed by user |
| List Price Source | The source of the Price. Where it was found or the name of the source import field |
| List Price updated on | The date that the Price was last updated. |
| Salvage Value | The current resale value of a device. |
| Duty Cycle | Maximum monthly page volume |
| Refresh Rate | The number of months the model should be used before being replaced. Default setting is set in Project Defaults by Model Class Type. Can be changed by user |

TABLE B8-continued

| Model Parameters | |
|---|---|
| Model Parameters | Description |
| Consumables | Open dialog with a listing of consumables used by Model. |
| Purchase Price | The customers Price of the device. By default, this will equal List Price. If a Discount is applied, it will represent the Discounted price. If the user changes it then it will be the Customer price. |
| Additional Soft Cost Description | Description of Additional Cost (Breakdown of charges) |
| Additional Soft Cost | Additional per Asset costs that affect all assets |
| Additional Hard Cost Description | Description of Additional Cost (Breakdown of charges) |
| Additional Hard Cost | Additional per Asset costs that affect all assets |
| Capabilities | |
| B&W speed PPM | The number of B&W pages per minute that the device can print (Required for all B&W-capable devices) |
| Color Capable | Model is capable of printing in color |
| Color speed PPM | The number of color pages per minute that the device can print (Required for all color-capable devices) |
| Device Capabilities | A listing of the Model Capabilities. Options; Duplex, Staple, Finishing, ETC. |
| Production | |
| Machine Life | The expected number of months the model is expected to be productive. |
| Rated Lifetime Volume | The Total number of pages a device is rated to do in it life cycle. Yield, # of copies, months; years... |
| Date Announced | Date when product was announced |
| Date Shipped | Date when product was first shipped |
| Date Discontinued | Date when product was discontinued (i.e. no longer manufactured) |
| Power | |
| Power Operating | Power consumption when running; units are in watts (highest power consumption) |
| Power Idle | Power consumption when device is idle (middle level power consumption) |
| Power Sleep | Power consumption when device is sleeping (lowest level power consumption) |
| Dimensions | |
| Width Inches | Device width in inches |
| Width Centimeters | Device width in cm |
| Depth Inches | Device depth in inches |
| Depth Centimeters | Device depth in cm |
| Foot Print Sq Foot | The amount of floor space in feet that a device uses. |
| Foot Print Sq Meters | The amount of floor space in meters that a device uses. |

TABLE B9

| Asset Parameters | |
|---|---|
| Asset Parameters | Description |
| Asset | |
| Model | |
| Device Type | Description of the Type of Device in use, the Class, does it print in color, and is it networked are the distinguishing features of the Device Type field. |
| Is Networked | Show if an Asset is networked (Yes/No), and is used in determining Device Type. |
| Business use | Describes predominant department using Asset (e.g. HR, Marketing, corporate, legal...) |
| Asset Status | User Definable listing of Assets statuses |
| Is space recoverable | The Office space used by Asset can be recovered and used for other purposes. |
| Comment | Comments |

TABLE B9-continued

Asset Parameters

| Asset Parameters | Description |
| --- | --- |
| Data Collection Identifier | An alphanumeric string used during Data Collection to Identify an Asset on Map. |
| Asset Creation Date | Date that Asset Record was created. System Generated Field. |
| Reporting Group ID | The budgetary groupings within project. |
| New Location | Place to enter in new location, Room: Column: Cube: |
| Identification | |
| Asset Number | Identifying number on customer's asset tag |
| Serial Number | Identifying number set by Manufacturer. |
| Profile | |
| Number of phone lines | Number of phone lines connected to fax Asset. |
| Number of network drops | Number of network drops associated with network printer. |
| Coverage | |
| B&W Coverage Rate | Percent of page area covered (or marked) by toner when a device prints an image. This value is used to determine the cost per page. |
| Color Coverage Rate | Percent of page area covered (or marked) by toner when a device prints an image. This value is used to determine the cost per page. |
| Equipment | |
| Purchase Date | The date the asset was Purchased. |
| Date Manufactured | The date the Asset was Manufactured. Check Assets manufacturers tag for date. |
| Asset Age (Months) | Displays the age of the asset age in months based on the Purchase Date, install date or model Discontinued Date. |
| Refresh Rate | The number of months the Asset should be used before being replaced. Default setting is set by the Model. Can be changed by user. |
| End Of Life Date | The estimated date that asset should be replaced |
| Purchase Price | The Price of an asset as provided by the customer. Overrides the Models Price |
| Salvage Value | The estimated resale or scrapped value of the Asset. (Not used) |
| Purchased | |
| Expensed | Asset was purchased and Expensed, not Depreciation. |
| Amount Expensed | The amount expensed, by default this is the purchase price. The finical costs {Taxes} of the asset were placed on a companies books at a single point in time. Assets costs were not depreciated over a period of time. |
| Date Expensed | The Date the Asset was expensed. |
| Is Fully Depreciated | Used to note that Asset is fully depreciated and that app should not include a base cost for this asset. |
| Months till Fully Depreciated | The number of months till the asset is fully depreciated |
| Date Fully Depreciated | The Date that the Asset will be fully depreciated. |
| Book Value | The amount of the assets purchase price yet to be depreciated |
| Trade-Out Value | The amount required by the customer in order to trade-out the asset and replace it with a new one. By default the Book Value. |
| Equipment Costs | |
| Equipment Contract Start Date | Date that the Equipment Contract Started on or will Start on (Future State) |
| Equipment Contract End Date | Date that the Equipment Contract will end on. |
| Months remaining on Contract | Months remaining on Equipment Contract based on End Date |
| Equipment Contract | Name of Equipment Contract. Used when asset is on lease or Rental. |
| Equipment Contract Residual | Amount Remaining on contract |
| Equipment Contract Buyout | Amount need to buyout a contract, or to end a contractual agreement. |
| Equipment Contracts Penalty | Penalty is Contract is ended early |

TABLE B9-continued

Asset Parameters

| Asset Parameters | Description |
|---|---|
| Monthly Depreciation | Amount of money sent each month on Depreciation costs. |
| Service Contract | Name of Service Contract, used when Service Contract is by a different provider then Equipment Contracts. |
| Monthly Service Cost | Asset Specific Service Costs. Flow from Area Service costs. Generally not used when there is a Service Contract in place but can be. |
| Supplies Contract | Name of Supplies Contract. Used to set Supplies costs. Only used when asset is NOT leased. Note: For Supplies Contract "Supplies Included" is Always True. |
| Infrastructure Costs | |
| Monthly Support Cost | Asset Specific Support Costs. Flow from Area Support costs. |
| Additional Hard Cost Description | Description of Additional Cost (Breakdown of charges) |
| Additional Hard Cost | Additional Hard costs for asset |
| Additional Area Hard Cost | Additional Hard costs for asset from Area |
| Additional Model Hard Cost | Additional Hard costs for asset from Model |
| Additional Soft Cost Description | Description of Additional Cost (Breakdown of charges) |
| Additional Soft Cost | Additional Soft costs for assets |
| Additional Area Soft Cost | Additional Soft costs for asset from Area |
| Additional Model Soft Cost | Additional Soft costs for asset from Model |
| Location | |
| System Name | Asset's Physical Name. Can get this data from XDM, XAM, and Device Discovery or manually entered |
| System Location | Asset's Physical location. Can get this data from XDM, XAM, and Device Discovery or manually entered |
| System Object Identification | Asset's Object ID (XDM, XAM, or Device Discovery) |
| System Firmware Version | Asset's firmware Version. (XDM, XAM, or Device Discovery) |
| System PPM | Asset's PPM. (XDM, XAM, or Device Discovery) |
| Building | Building where asset is located |
| Floor | Floor where asset is located |
| Room | Room where asset is located |
| Column | Column closest to where asset is located |
| Street Address | Street Address where asset is located |
| City | City where asset is located |
| State | State where asset is located |
| Postal Code | Postal Code where asset is located |
| Country | Country where asset is located |
| Network | |
| MAC Address | MAC address for active Ethernet network printers. |
| IP Address | Asset's last know IP address |
| IP Subnet Address | Asset's IP Subnet address |
| IPX Address | Asset's IPX address |
| Discovered Date | Date Asset was first discovered |
| Last communication Date | The last date that XDM or Device Discovery last communicated with Asset. |
| Last communication Attempt Date | The last date that XDM or Device Discovery last attempted to communicated with Asset. |
| Ownership | |
| Asset Owner | Owner of asset |
| Organization | Organization that owns asset or where asset is located |
| Department | Department that owns asset or where asset is located |
| Cost Center | Cost Center that asset is billed to. |
| Building Manager | Building Manager that is responsible for Asset |
| Date Warranty | End Date on Warranty |
| Total Volume | |
| Total Monthly Volume | |
| Total Monthly Color Volume | |
| Meter Volumes | |
| B&W Copier Monthly Volume | |

TABLE B9-continued

Asset Parameters

| Asset Parameters | Description |
| --- | --- |
| Color Copier Monthly Volume | |
| B&W Printer Monthly Volume | |
| Color Printer Monthly Volume | |
| Scanner Monthly Volume | |
| Fax Pages Received Monthly Volume | |
| Fax Pages Sent Monthly Volume | |
| Paper Size Usage (9) | Estimate the distribution of paper sizes used throughout project. Printing on larger paper sizes uses more consumables and consequently costs more. |
| % Paper Size used US Letter | Fraction of jobs printed on 8.5 × 11" paper (typical US size) |
| % Paper Size used US Legal | Fraction of jobs printed on 8.5 × 14" paper |
| % Paper Size used Tabloid | Fraction of jobs printed on 11 × 17" paper |
| % Paper Size used A4 | Fraction of jobs printed on 210 × 297 mm paper (typical size outside US) |
| % Paper Size used A3 | Fraction of jobs printed on 297 × 420 mm paper |
| % Paper Size used B4 | Fraction of jobs printed on 257 × 364 mm paper |
| Color Usage (10) | |
| Color Volume Usage Rate | When normalizing meters XODAT will use this Percentage to estimate the number color pages printed in color when there are no Color Meters on a color capable Asset. |
| Report controls | |
| Include Count | Include this asset in device count analysis |
| Include Cost | Include this asset's cost in device count/device type analysis |

Similarly, the various scenarios that may be associated with or drive the alternative proposals may also have specific parameters such as those depicted in Table B10. Scenario modeling is a significant component of the ODA analysis process. ODA scenario modeling is used to interactively reconfigure an area (or zone), by removing, adding and moving output devices (guided by operational metrics, cost and customer constraints) on a floor map of an area or zone. Each area and zone in the customer environment is optimized using scenario modeling. Once all areas are optimized, the Future State Presentation Reports are generated.

In scenario modeling Assets are manipulated (removed, added and moved) on the area floor map. Metrics (utilization and cost) are used to guide the assignment of unallocated (because Assets were removed) output volume to new Assets. New Asset placement and capacity are adjusted to meet predefined customer requirements (convenience, cost and business constraints). When scenario modeling is complete the configuration of the new scenario is saved. The Future State Presentation Report summarizes the metrics for all modeled scenarios. However, before scenario modeling can start project-specific cost and Asset inventory, usage and price information must be gathered. In accordance with an aspect of the system, ODA will calculate the cost of generating the observed output volumes for each location based, on the project-specific cost parameters.

TABLE B10

Scenario Information Parameters

Scenario Information

| | |
| --- | --- |
| Scenario Name | Name given to Scenario. Note: that the Default Scenario is "Current" and that Scenario Name for "Current" is not Editable. |

TABLE B10-continued

Scenario Information Parameters

Scenario Information

| | |
| --- | --- |
| Scenario Description | Description of Scenario |
| Scenario Status | Categorization of the Proposed Scenario's Assessment and Optimization status. Options include; In Progress, Optimized pending review, Optimized. |
| Is Future State | Project Flag that allows user to select one Scenario to designate it as the clients Future State. |

Figure 13:
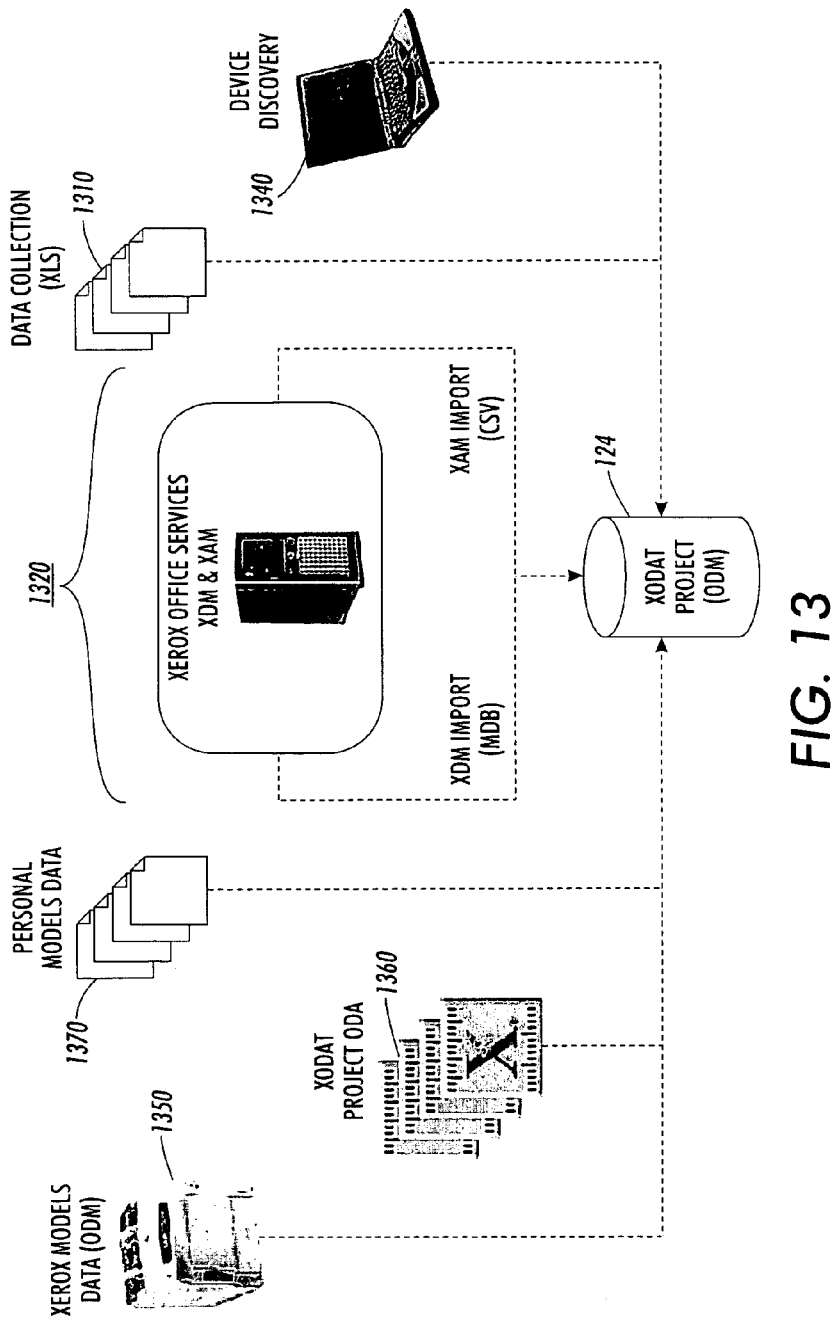
FIGS. 13 and 14 illustrate the data sources and outputs of the system and methods described herein.
Figure 14:
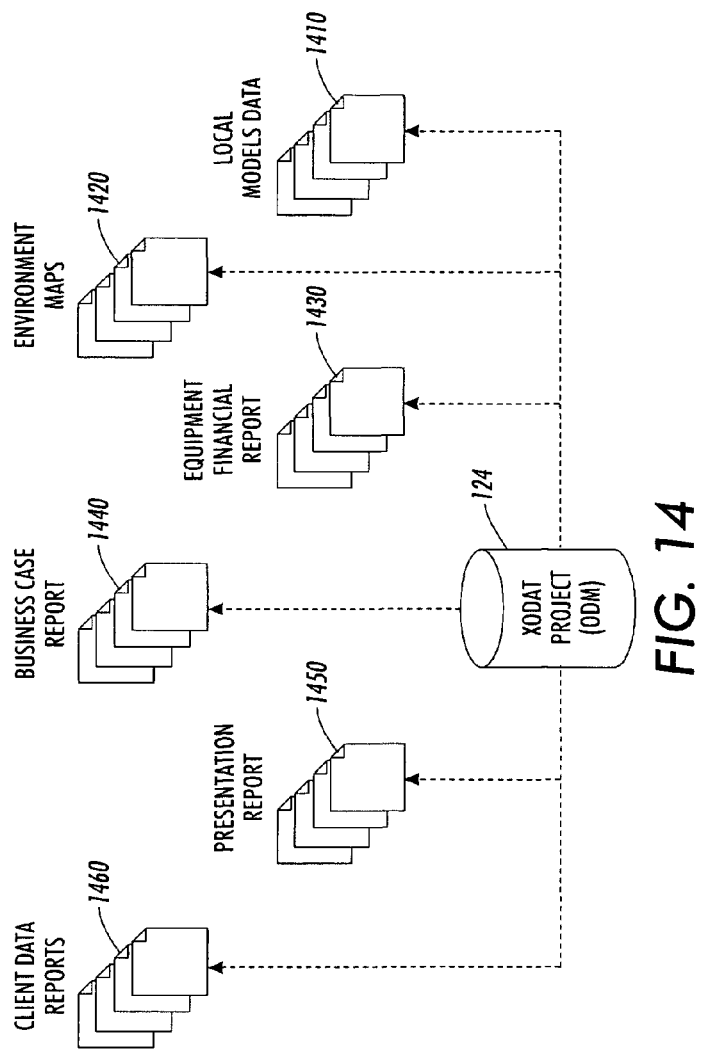
Figure 15A:
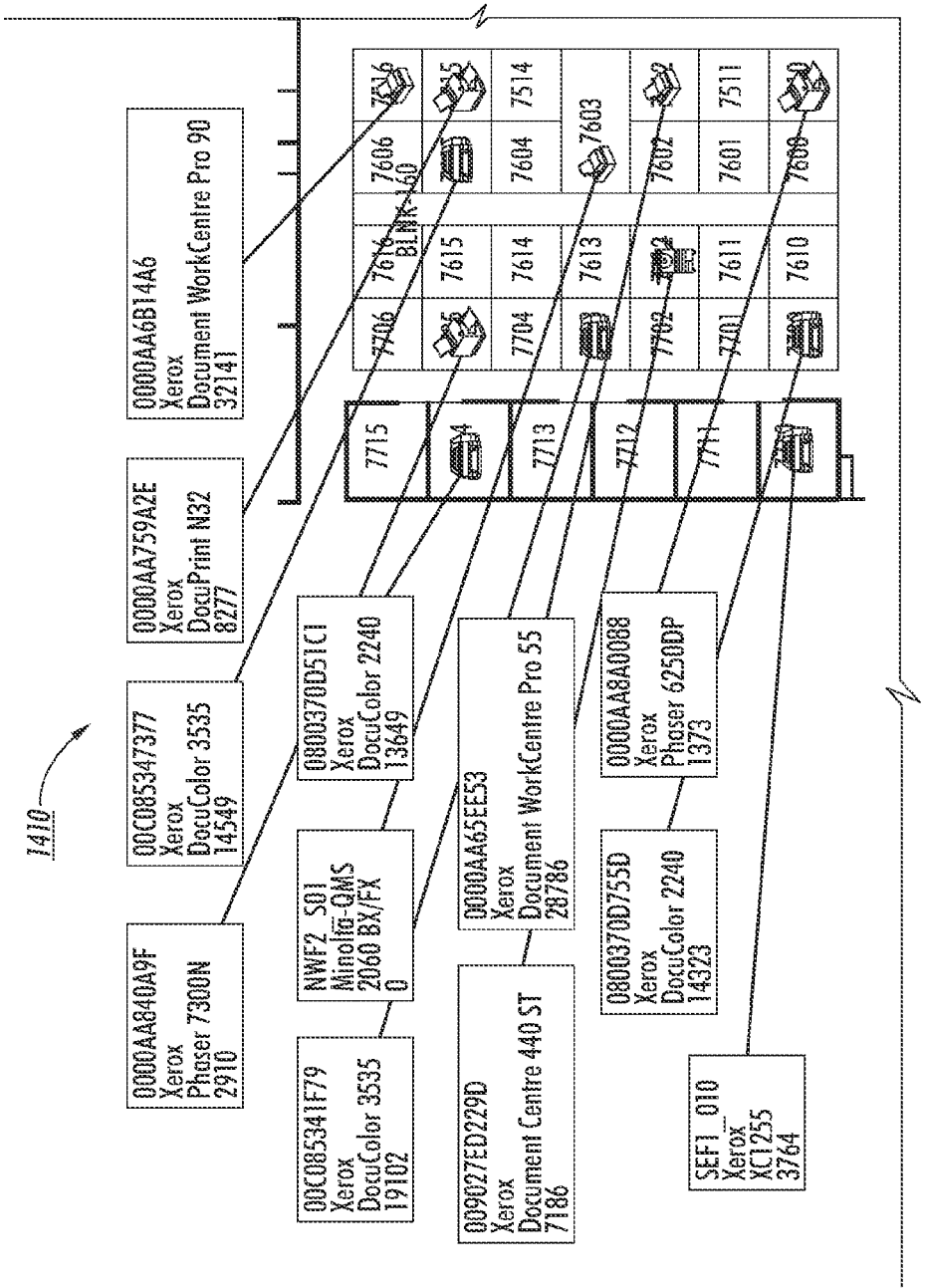
FIGS. 15A-D and 16A-B are exemplary representations of a project map and inventory in accordance with an aspect of the ODA system.
Figure 15B:
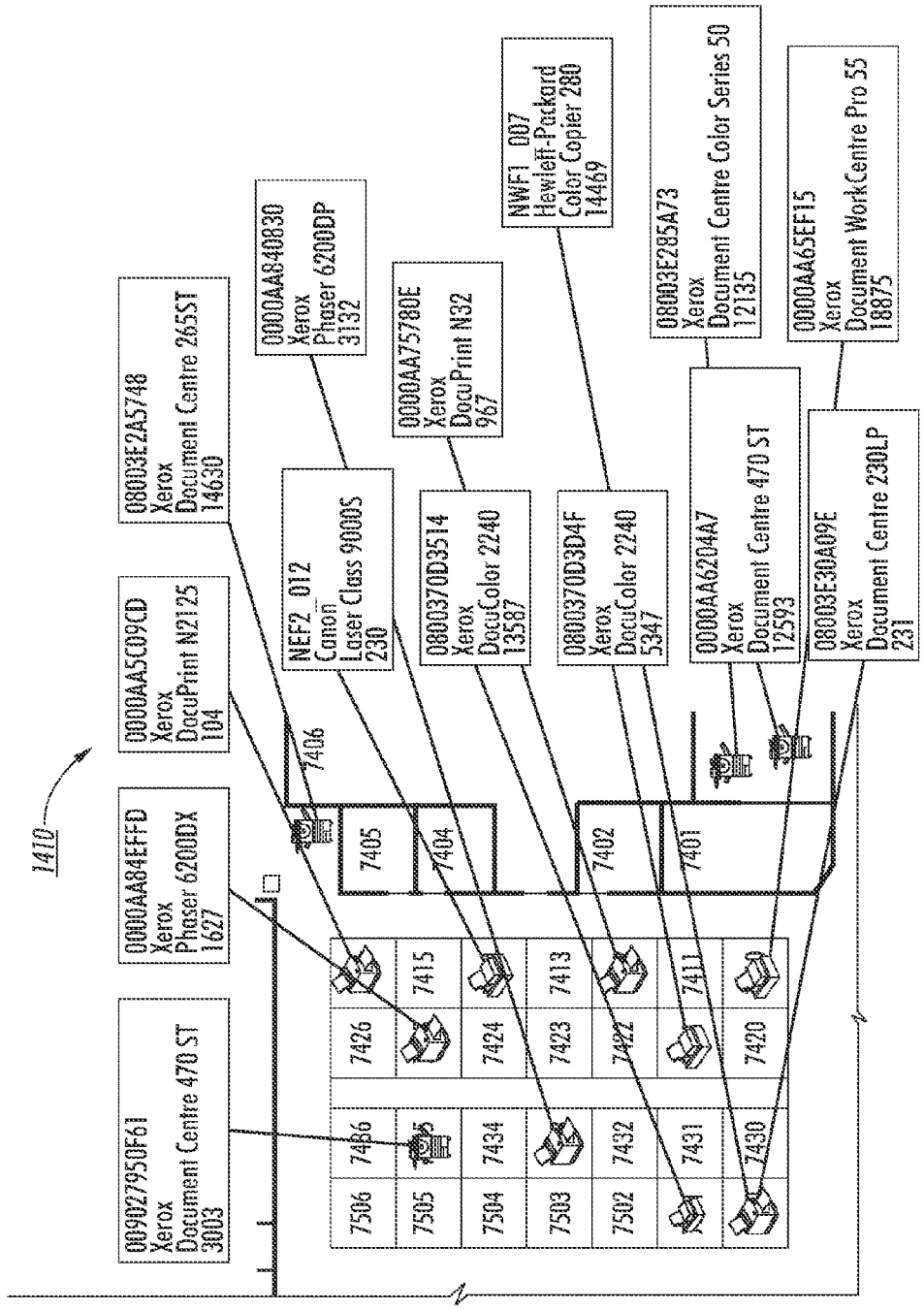
Figure 15C:
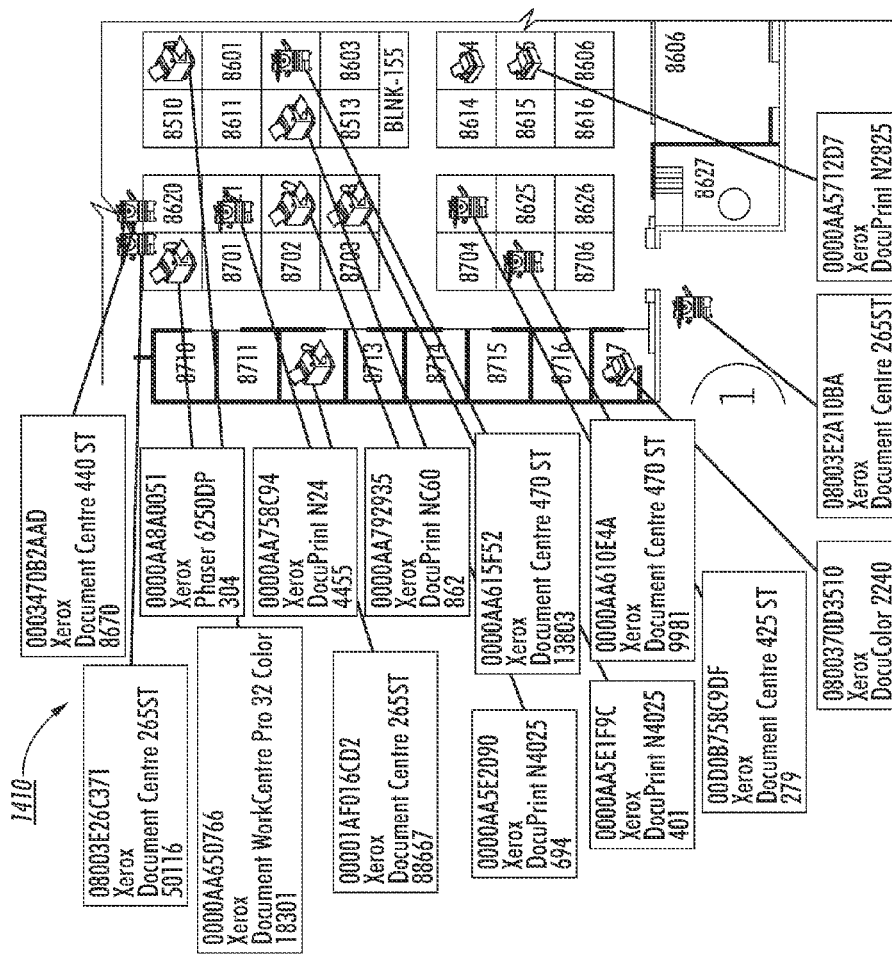
Figure 15D:
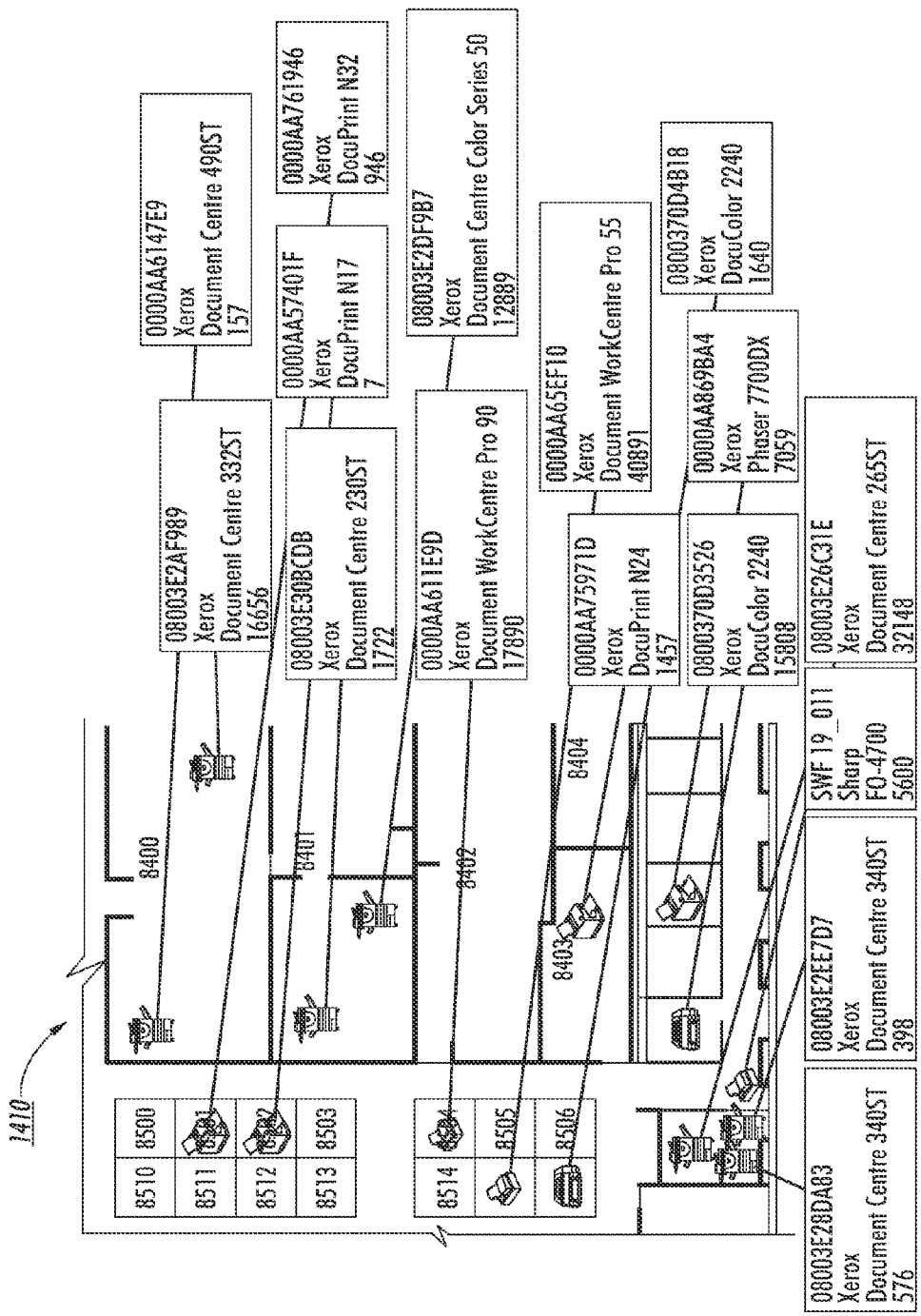
Figure 16A:
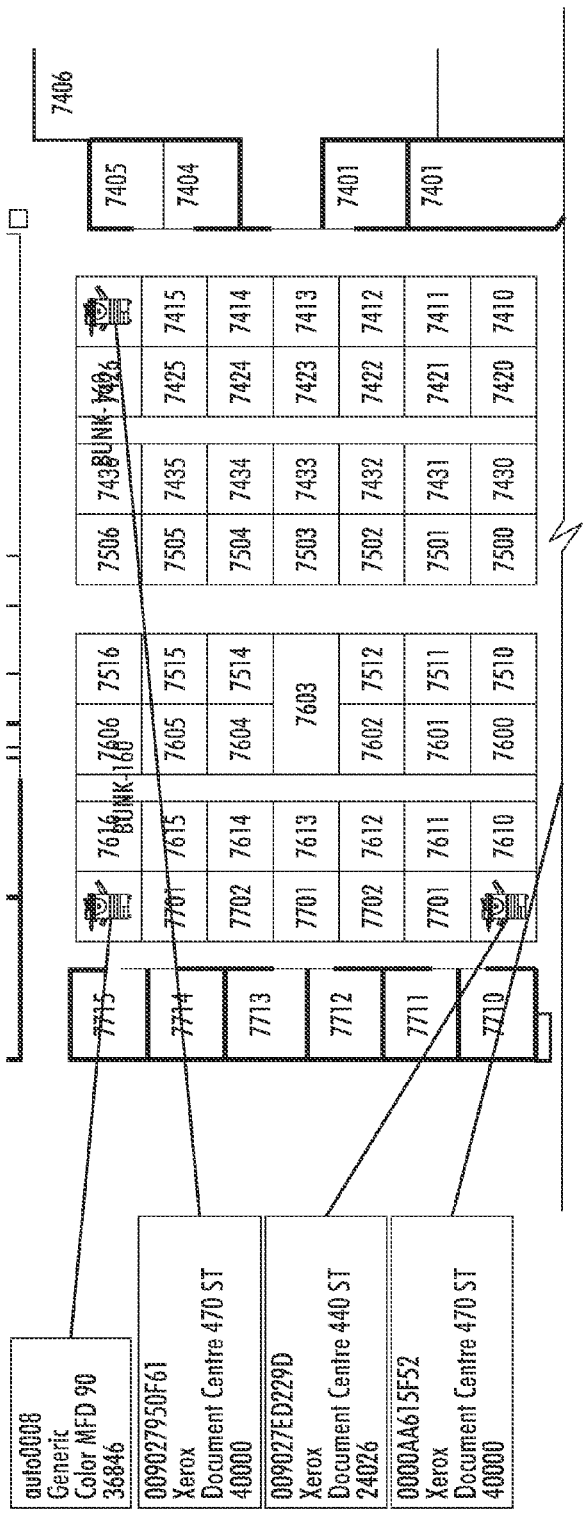
Figure 16B:
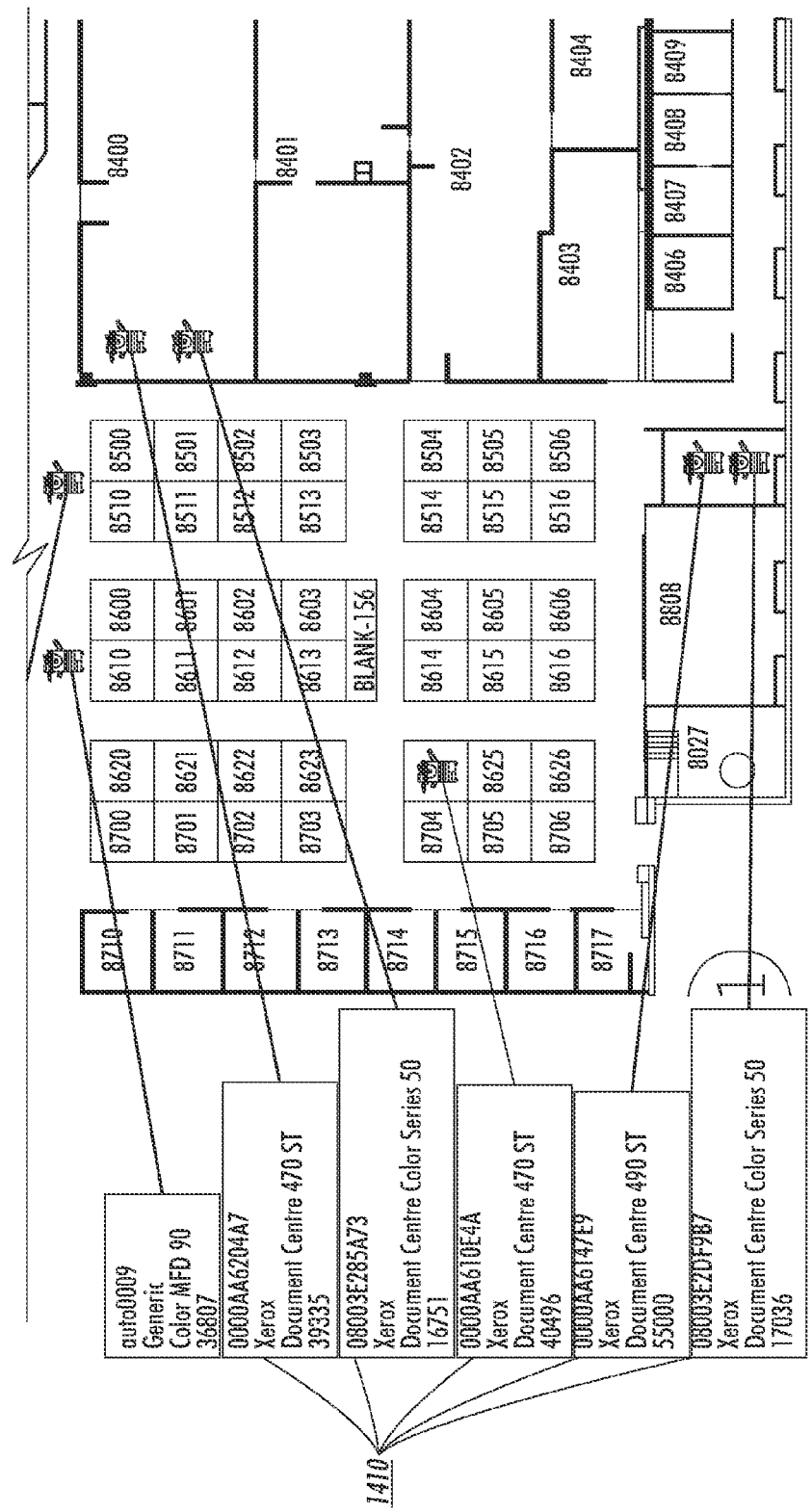

Turning next to FIGS. 13 and 14, the figures illustrate the data sources and outputs of the system and methods described herein. More specifically, there are several ways to collect inventory data and the ODA system provides several options for getting that inventoried data into a Project Database 124 as illustrated in FIG. 13. From a basic Excel Data Collection Worksheet 1310, to using XDM or XAM data 1320, to using computerized, embedded Device Discovery tools 1340. Additionally, the data may be obtained from models 1350, project-specific data 1360, or personalized models 1370. Once stored, the data with a project database may be analyzed and processed as described herein. In particular, the ODA system analyzes the current state of the customer's office document environment within a plurality of defined areas to characterize at least one cost and usage metric for each area, and aggregates such cost and usage metrics to generate project metrics. The project metrics depict the current or future state of the customer's office document environment.

As represented by FIG. 14, the database may also be employed in the reporting of the current and future state scenarios, by modeling projected operating costs of an optimized office output device environment for the customer, where the model is based upon the usage metrics for the plurality of defined areas. As illustrated in FIG. 14, the usage information for the project may be output or reported in various ways, including local model costs 1410, environment maps 1420, equipment financial reports 1430, business case reports 1440, presentations 1450 and/or cost reports 1460.

As illustrated, for example, in FIGS. 15A-D and 16A-B, environment maps may be used to show current state (FIGS. 15A-D) and future state (FIGS. 16A-B), in a specific project. It is also understood that in some respects, showing the current and future state maps, may operate to quickly inform a reviewer of the nature of the proposed changes or differences between the current and future states. In addition to being zoned as previously described relative to FIG. 6, maps 1410 also include references 1420 to the various office document assets in the area.

Figure 17:
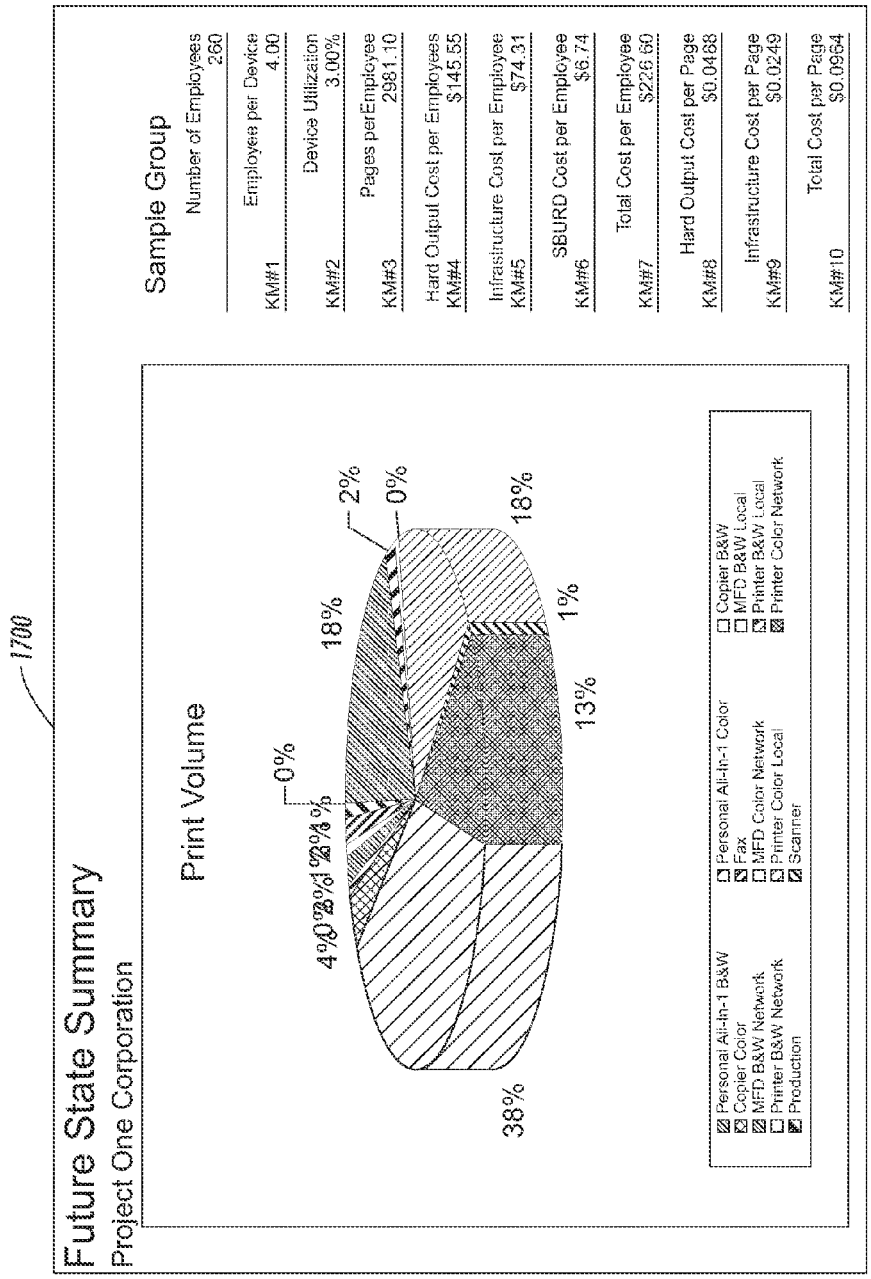
FIGS. 17 and 18 are illustrative examples of reporting formats for the reports depicted in FIG. 14.
Figure 18:
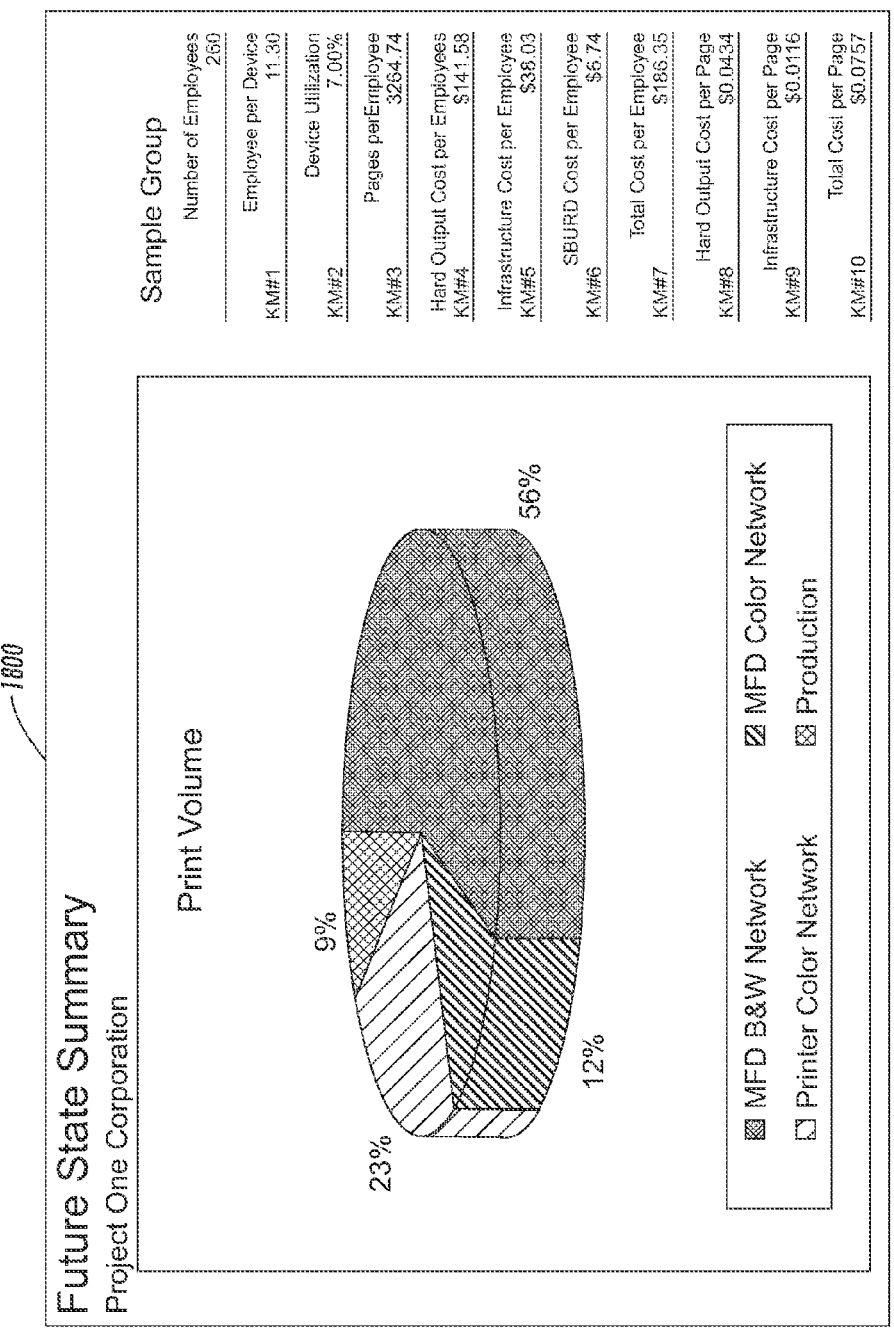

Referring to FIGS. 14 and 17-18, the current and future state (Presentation) reports generated by ODA summarize project and reporting group statistics, and contain detailed data to support summary reports and the business case reports. The Current State Presentation Report 1700, characterizes the customer's environment before asset optimization. The Future State Presentation Report characterizes the optimized environment produced using ODA (scenario modeling). Future State Presentation Reports 1800 are generated after at least some, and preferably, all areas and/or zones have been optimized.

Having described the various databases, and equipment, attention is now turned to a general description of the functionality of the ODA system. Each assessment, optimization project, or customer engagement, may be represented by a separate ODA project. An ODA project contains the customer-specific layout, cost, asset and consumable information. The organization of the ODA project resembles that of the physical relationships of the areas (zones) analyzed. The results of the ODA analysis, however, are presented in terms of organizational function or financial/budgetary alignment.

The purpose of a project is to accurately represent the client areas; characterize the monthly volume for each device type; and estimate the operating cost within each. A user will use ODA to characterize the current state operating cost and to model a more cost-effective configuration in each area, based on Asset volumes and various individual operating costs. As indicated, for example, in the maps of FIGS. 15A-D and 16A-B, the number of assets can be significantly reduced in many situations with little compromise of document generation capacity. The ODA project is created at the start of the engagement, structured to mirror the physical relationships among the customer areas. Customer-specific cost parameters and cost calculation criteria are stored in the ODA project structure and used when operating costs are calculated. Asset inventory, cost, location and usage information is stored in the project database 124 for each area. Once all of the areas within in a project have a complete set of asset information (inventory, cost and usage) scenario modeling is performed.

ODA will calculate the cost of operating the inventoried assets using power consumption information from the models database. Power cost is one project-specific cost that is provided at the project level and cascaded as described above. Other parameters such as those listed in the tables above can be set to determine how and what is included when the system performs its calculations; these parameters are set based on what the customer thinks is important and how the customer accounts for costs. For example, access to a network drop by a printer results in a monthly charge for some departments; in such cases, a flag "include network cost" would be set.

The number of employees in each area (see Table B2) is also utilized in the analysis phase to calculate various cost and usage metrics; e.g. cost- or pages-per employee. These values are subsequently used to summarize the optimization and compare projects. Ideally, the client would provide this number. The number should reflect the number of employees actively working in the area during the data collection period. This number should be roughly equivalent to the number of seats in the observed area, occupied by employees who typically use the output devices. For example, if an area contained a room full of telephone support personnel who never use an output device; the number of people in this room would not be included in the area census. It may be estimated by actually counting the number of physical seats in the area. However, this counting method may be inaccurate when there are multiple shifts with differing numbers of works per shift using the same space. Furthermore, the numbers of working and non-working days in the observed period, and workday length, also in Table B2, are crucial to calculating utilization.

In one embodiment, ODA is based on a hierarchical structure, which has the project as the top-most point, below which the project elements are arranged in a tree structure similar to the elements' physical relationships. At the very end of the hierarchy are areas and zones, where maps and assets are reflected and collected. For scenario modeling purposes areas can be sub-divided into zones, which define "reasonable" limits within which an optimization makes sense. Scenario modeling is performed on zones and areas. The user of the ODA application will define and layout the project structure, which can be updated at any time during the project. This structure will likely mirror the physical layout of the client's site. For example, collections may correspond to campuses or buildings; areas may correspond to floors or parts of floors; and zones may correspond to sections of floors. A floor map must be associated in ODA with each area before scenario modeling can be performed. The floor map is used to illustrate asset locations in the current state and guide scenario modeling as the future state is defined. Moreover, various parameters may be set locally, either at the collection or area level where they are used by all areas contained therein as described above relative to FIGS. 7, 11 ands 12A-B. ODA graphically shows the project layout, and permits navigating and accessing project components in a simple window-based user interface.

After the necessary project information has been entered and all zones and areas have been updated with asset inventory and usage information the current state presentation reports 1700 can be generated. Similarly, after all zones and areas have been optimized the future state presentation reports 1800 can be generated.

Figure 19:
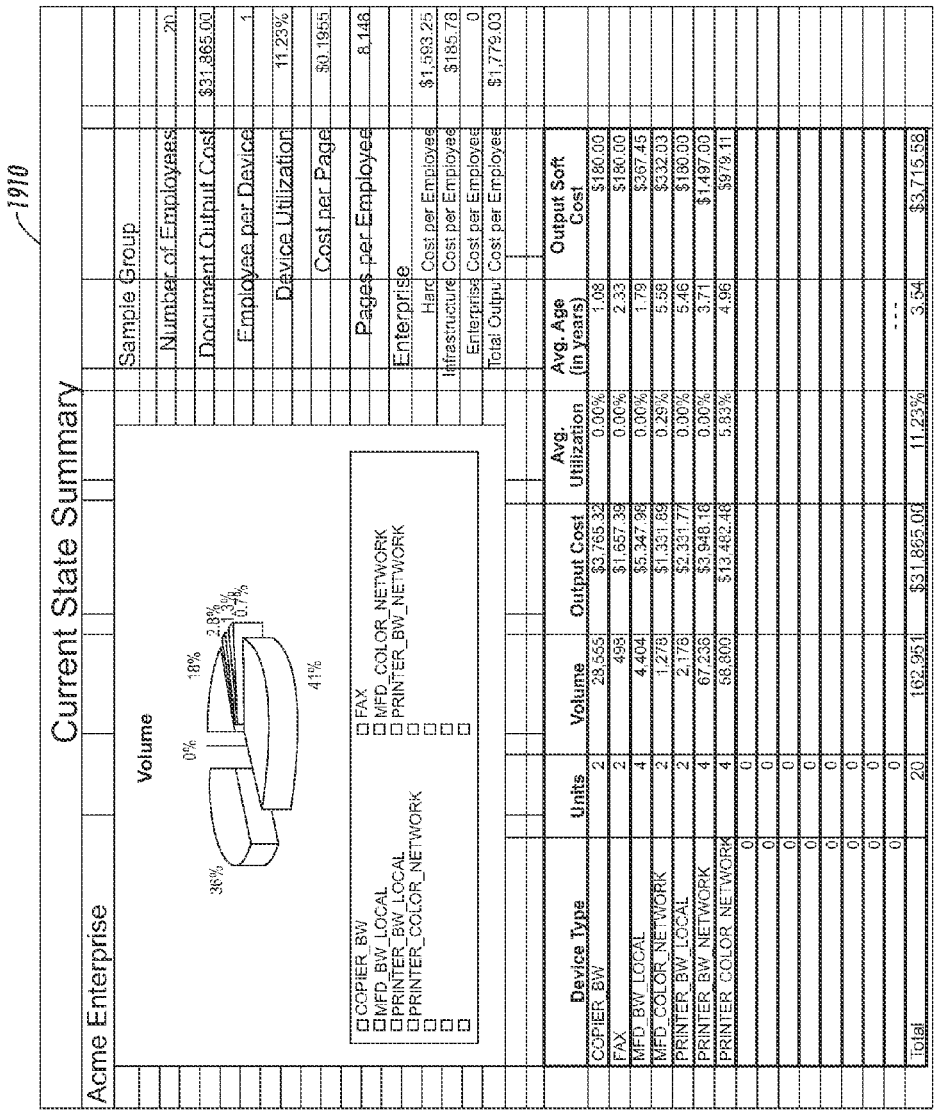

ODA reports (FIGS. 14, 17 and 18) are generated based on reporting groups and locations. Each asset is assigned to a reporting group ID and to an area. The ODA current and future state presentation reports summarize asset statistics and metrics based on reporting group and area. As illustrated in the further report examples of FIGS. 19 and 20 (reports 1910 and 2010, respectively), Reporting Groups (Acme Enterprise Sample Group) are defined, based on customer requirements, when the project is created. Reporting groups may be defined to correspond to how the customer prefers the results to be summarized. They may define an asset with common functional (e.g. departmental or workflow), cost accounting or budgetary characteristics. Reporting groups should also be large enough to be meaningful (e.g., contain a number of assets). Said another way, too many reporting groups with too few assets may not provide useful or meaningful information. In some cases, performing and reporting an analysis based on physical layout as depicted in FIGS. 15A-D, 16A-B, may be of little value to the customer. For example, a hospital floor might have several departments (administrative, patient care, and research), each with its own funding and distinct requirements and usage patterns—all of which define distinct output environments. Therefore, ODA allows assigning assets to reporting groups, which are then used to group assets when reporting on the optimization.

The ODA user will gather asset inventory and volume information, which defines the various types and amounts of output volume that must be enabled when the optimized scenario is modeled. That is, at the start of scenario modeling the user will know both the BAN and color, and copy, print and fax volumes that occur in a typical month. The assets in the optimized configuration must be capable of handling these volumes cost-effectively—and at acceptable utilization levels. The user will need to input into the project database cost information for purchased and leased assets, and consumables. Purchased assets and consumable costs can be estimated using industry standard list prices found in the models database. However, lease prices cannot be estimated from the models database, these must be obtained from the customer. Prices of purchased assets are used to estimate how much the client is likely to spend in future years, based on the asset purchase rate inferred from the area inventory. Asset purchase costs are extrapolated over 3-5 years into the future using asset prices and estimated purchase dates. This information appears in the Business Case. Asset price information can come: 1) directly from the customer on a per asset basis (individual price for each Asset), 2) a per-model basis (that is, a particular price for all instances of a specific model), or 3) using recent list prices from the models database with a client-specific discount applied. Monthly cost of leased assets (i.e. Equipment Lease) is used to determine how much the client spends each month on equipment. These costs are summarized during scenario modeling, in the Current and Future State Presentation Reports and appear in the Business Case. Consumables prices and usage volumes for each asset are used to calculate monthly supplies costs for each area during Scenario Modeling, and for each Reporting Group in the Current and Future State Presentation Reports and in the Business Case. Consumables costs are important when estimating monthly operating costs.

The ODA system and method disclosed uses industry standard prices for assets and consumables, the standard prices having been obtained from the models database by default, and discounted accordingly using the project-level discount rates. Per-model or per-asset prices provided by the client override the default prices. Consumables are discounted similarly. Also, discounts are applied only to default "list" prices (for both equipment and supplies); not to customer-provided prices. In addition, discounts to supplies are only applied when the user exits Project Defaults.

In the Asset inventory phase, the user collects information that describes all the output devices in an area. The manufacturer, model, location, meter volume and other identifying information are recorded for each asset. This inventory list is subsequently used to obtain a second meter read, later in the observation period, for each Asset. ODA will look-up the manufacturer and model of each asset entered in the inventory in the models database to obtain device information used in operating cost calculations. For example, print speed(s) (e.g. B&W and color) are used to calculate utilization, power rating is used to calculate power cost (given page volume and operating speed), and footprint is used to calculate the cost of space occupied. Cost, as mentioned above, is used to estimate future annual asset expenditures. As will be appreciated, the ODA system requires that device model information be complete before the user can perform scenario modeling.

Monthly usage volume and cost are extrapolated based on volume observed during a data collection period. Monthly volume usage information is calculated for each asset based on the data collection period start and end dates. The monthly volume depends on the number of workdays in the observation period. For example, if an asset had a volume of 12,000 pages during 15 days of a 20-day month, the monthly volume would be approximately 16,000 pages. The utilization value also depends on the length of the workday. For example, utilization for a 3-shift (i.e. continuous) operation would be one third that of a single-shift (i.e. 8-hour) operation, given identical page volume and the same number of workdays.

The methodology for obtaining requirements (or optimization constraints) from the client should include a documentation step whereby the user develops an understanding of the client's requirements and constraint, such as:

(a) Convenience—proximity and distribution of network assets relative to users;

(b) Personal-use policies—conditions under which personal-use printers allowed;

(c) Specific Requirements—duplex printing, scan-to-email, color output, stapling/finishing, photographic quality, tabloid printing, etc.; and (d) Asset replacement, removal and move policies—conditions required for and assets to be replaced, removed or moved, including how any particular device type, condition, age, and capability should be handled.

A goal of collecting such information would be to understand any constraints or requirements of the customer so that the requirements could be factored into any proposal that may be modeled using the ODA tools. It will be appreciated that a Customer Account Representative, or the customers themselves, would be sources of such information. Depending upon the desired embodiment for the ODA system, such constraints may be tracked and entered in several ways. For example, in an embodiment where the constraints cannot be entered directly, a user might keep track of them while they optimize an area. Such tracking may be facilitated by a workflow decision tree (separate from ODA) that is followed during optimization. In another embodiment, it is contemplated that the ODA system may enable the entry of such constraints on a project, region or area basis, or provide an automated decision tree, wherein the above-identified constraints are entered/tracked as the user uses ODA to optimize an area.

The criteria described above may be applied uniformly to all project areas or, as described previously, defined uniquely for one or more areas. These criteria define the considerations that must be applied during interactive scenario modeling. The ODA system gives the user the option to include or exclude various costs in the analysis and calculations through the use of inclusion flags. Hard costs are costs or money that can be saved when an asset is removed. These include all out-of-pocket expenses incurred while operating the output environment during a month. For example, when an asset is removed it is unplugged and no longer uses electricity resulting in a decrease in electric costs. Hard costs are a summation of hard output costs and infrastructure costs configured as hard costs. Hard infrastructure costs typically include phone, and power, but can also include network costs if the client pays or tracks costs relative to the network. In rare cases, space and support may also be included as a hard costs but are more typically considered as soft costs.

Soft costs are costs that will still occur even after the asset has been removed. For example, when a client is renting a building and an asset is removed the client must still pay for the floor space the asset was using. Soft costs are those (Infrastructure) costs that can not be recuperated when an asset is removed.

As another aspect, when calculating consumable costs, color consumable's cost per page is only applied to color volume while B&W consumable's cost per page is applied to the total volume. The resulting Total B&W consumable usage cost is then proportionally divided between the B&W volume and the color volume. The portion used in printing color pages is included in the Color Hard Output Costs along with the along with the color consumable usage cost. The remaining portion used in printing B&W pages is in the B&W Hard Output Costs. The consumables cost is typically the most significant contributor to hard cost for assets not covered by an equipment contract with supplies or a supplies contract. Depending on how the client accounts for infrastructure costs, you have the option of assigning them to hard or soft costs, in some case to both hard and soft, or not counting them at all.

Phone costs are associated with active fax-capable devices. In the embodiment described, phone costs cannot be associated devices that are not fax-capable. Phone costs can be counted as either hard and/or soft costs. Phone costs are a hard cost when they result in a direct out-of-pocket charge. They are a soft cost when they result in a reallocation of a line. They can be both when there are both costs for the phone line and for use of the IT infrastructure.

Network costs are associated with network capable devices or non-network capable device that have been fitted with an add-on that makes them network capable. Network costs can be counted as either hard and/or soft costs. Network costs are a hard cost when they result in an out-of-pocket charge. They are a soft cost when they result from general infrastructure costs that remain even after the asset is removed. They can be both when there are both costs for the network drop and for use of the IT infrastructure.

Power costs are associated with the amount of electrical power required to run the device. Each Device will have a running power usage (when producing output) and an idle power usage. Power costs can be counted as either hard or soft costs. By default they are considered to be hard as it is typically considered to be out-of-pocket charge. However the client may see this as a soft cost.

Space costs are associated with the amount of floor space a device may require for proper operation. Each device has an estimated foot print, or the floor space required by the service manual. Space may be recovered when a device is removed and a cost saving realized for large devices when that space can be put to another use. By default these costs are considered to be soft and not recoverable when a device is removed. However the client may see this as a hard cost or not as a cost at all.

Support costs are associated with the time and effort required to support the user base in their document printing, faxing, and scanning efforts. In some instances this data, in varying levels of detail (per asset/per enterprise), will be available from the clients or third parties; IT Department, Help Desk or Support group. In other instances it may not be available at all. Note: Support costs a.k.a. Help Desk costs can either be represent on a per asset bases (Support costs) OR on an enterprise level (Help Desk costs). Only in the rarest of conditions will you have both. Support (per asset) costs can be counted as either hard or soft costs. By default these costs are considered to be soft and not recoverable when a device is removed. However the client may see this as a hard cost or not as a cost at all.

Additional costs are variances allowed for costs that may occur that have not been taken into account by other areas of the ODA application. These variances can occur at the area, the device model, or for a particular asset. Additional costs are straight-line costs that can be counted as either hard and or soft costs. Additional costs are a hard cost when they result in an out-of-pocket charge, and soft when they result in none recoverable charges. By default Additional costs are not counted, either hard or soft costs may be counted or both.

SBURD (Shop, Buy, Use, Redeploy and Dispose) Costs are costs that occur at an enterprise level. These costs, such as the cost of processing a purchase order for supplies, apply to the entire "fleet" of output devices and are not tied directly to a specific asset. SBURD is the costs of employee effort expended in managing the lifecycle of document output devices. SBURD cost attempts to assess lifecycle costs. The ODA system may also include the following costs in the database and analysis: help desk inventory processing, wage-related (for managerial, administrative, and professional level personnel), and other (custom) costs in the calculation of SBURD. Personnel costs are based on the amount of time spent by each category dealing with output-related issues. Note: these costs are likely to change when the customer goes from a heterogeneous to a more homogeneous network/multi-function environment.

ODA includes the cost of processing output-related PO's (purchase orders), invoices (for equipment, supplies and service) based on the costs of generating PO's and processing purchase orders and the respective numbers of each. ODA also includes internal costs of managers, administrators and professionals involved in output-related tasks using estimates of the respective amounts of time and cost for each.

Help desk (support) costs can be included in SBURD or may be allocated on a per asset basis. On the per asset basis the cost can be specified within the local profile (see Support Cost in Table B2) or at the asset level. Note that Help Desk costs should appear in only one (NOT both) of these places. If a user wants to build a more in-depth model that reflects client's cost accounting and work structure, this could be done as an adjunct to ODA, and then plugged into ODA as Other Costs. Accordingly, it is contemplated that such features and modifications are within the scope of the ODA system and methods.

Additionally, a user might want to consider the carrying and/or storage cost for consumables inventory and include that in the Other SBURD cost. Inclusion of SBURD expense often requires a detailed explanation of its derivation. However, SBURD costs are often a significant factor contributing to direct hard costs to the customer. Factors to consider in developing an SBURD cost model are:

Salaries of personnel involved
Purchase frequencies for assets and consumables
Time to specify, order and approve asset, consumables, leases and support contracts
Internal costs for processing purchase orders or reimbursing employees
Help desk costs and usage frequency for output devices
Internal costs of placing a service call
Service call frequency and cost
Disposal cost
Costs to redeploy or dispose unused supplies Once input, the key metrics are calculated and displayed by ODA during analysis and summarized in the Current and Future State Presentation Reports for both the entire project and individual Reporting Groups. Perhaps the most important metrics are utilization and hard cost, which are used both in scenario modeling as guides and appear in the ODA reports.

Utilization describes the productivity or "busyness" of an asset. Hard cost is the out-of-pocket cost of operating. Utilization is an indicator of cost-effective use, in general.

Various costs can be summarized on a per-page or per-employee basis. The per-page costs are most accurate because the number of pages or volume is readily obtained from asset meters or configuration pages. The number of employees in an area is at best an estimate. For a single shift operation, it is typically no more than the number of seats in an area.

Employee-to-device (Asset) ratio: The employee-to-device ratio describes the predominance of assets relative to employees; a ratio of one means that there is one asset for each employee; a ratio less than one means that there are more assets than employees. Typically, in a cost-effective network printer or multifunction environment this number is optimally near 10, such that many employees share a single asset. A low employee-to-device ratio is an indicator that the area is likely to benefit from scenario modeling. Accurate and consistent counts of the number of employees are necessary if this metric is to be compared across areas, projects, companies and industries.

Employee to Device Ratio=(Number of Employees)/Sum of(Number of Assets)

Utilization: Utilization provides a measure of the productivity or "busyness" of an asset. It describes, based on the asset's observed page volume, the fraction of available work time that the asset was running. Since the page volume is known for the observed period, it is possible to estimate the fraction of work time that the machine was busy printing, copying or faxing. Utilization in the range of 3% to 7% may be considered acceptable. Higher utilization values imply that users may experience delays or waits for their output. Utilization can be calculated for either a single asset or an aggregate of assets. When it is calculated for an aggregate its meaning is preserved and extends to describe the utilization of all the available machine-minutes for all the assets in the aggregate.

Device Utilization=(((Sum of(Black Operating Minutes+Color Operating Minutes))/Sum of(Minutes of Operation))×100), where Minutes of Operation=(60×Work Hours per Day× Work Days per Month);

Black Operating Minutes=(Total Monthly Volume−Total Monthly Color Volume)/Model Black PPM; and Color Operating Minutes=Total Monthly Color Volume/(Model Color PPM).

Leased Assets operation is more cost-effective when utilization is "high", and least cost-effectively when utilization is "low". Consider the page cost of a leased 50-ppm multifunction device on a $200/month contract printing 15,000 pages; the effective cost per page is $0.013 and utilization is just 3%. When the same MFD prints only 1 page, utilization is practically 0 and the cost per page is about $200. Leased Assets are most cost-effective when utilization is high and least cost-effective when it is low.

Similarly, non-leased Assets, especially with high costs per copy (e.g. ink jets and color laser printers) are more expensive to operate when their utilization is high. For many reasons the power and meaning of utilization is diminished when it is aggregated over zones, areas, collections, and the project. Certain low utilization assets might be exempted, for a variety of valid reasons, from removal during optimization and will lower the utilization value of any aggregate in which they are included. Other customer-imposed constraints, such as convenient access to assets, might force configurations that would seem unreasonable if utilization alone were considered. Utilization can be calculated for either a single Asset or an aggregate of Assets. When it is calculated for an aggregate its meaning is preserved and extends to describe the utilization of all the available machine-minutes for all the assets in the aggregate. Customers who achieve high utilization over a large number of assets should be proud and satisfied.

Utilization aggregated over an area, as mentioned above, can be diluted for various reasons. However, its meaning remains the same. Utilization is a measure of how much an output device is in use (i.e. busy printing) over all the time available for use (i.e. business hours). There may be valid (customer) reasons why utilization is (must be) low for an asset or in an asset aggregate.

Pages per employee, or Images per Employee Ratio, is a measure of the amount of output generated by each employee in a month; this is an average value based on the total observed volume and the number of employees.

Images per Employee Ratio=Sum of(Total Monthly Volume)/(Number of Employees)

In reality, some employees may print more than others. This metric and cost per page can be used to calculate the monthly cost for providing output to the employees in an area. Note: the count is the number of (simplex) pages generated per employee in a month. A page can have either one or two printed images. To calculate the number of pages (of paper) per employee per month, the fraction of the pages that were printed duplex for the number of pages per month must be known. The following measures may also be calculated during the analysis and reported:

Hard Output Cost per Employee: The Hard Output Cost of Equipment, Service and Supplies in divided by the number of Employees to show how much the customer is spending on. Device Output Costs per employee.

Hard Output Cost per Employee=[Sum of(Black Hard Output Cost)+Sum of(Color Hard Output Cost)]/(Number of Employees)

Infrastructure Cost per Employee: The Hard and Soft Infrastructure Costs are added up and divided by the number of Employees to show how much the customer is spending on Infrastructure Costs per employee.

Infrastructure Cost per Employee=Sum of(Hard Infrastructure Cost+Soft Infrastructure Cost)/(Number of Employees)

SBURD Cost per Employee: The Shop/Buy/Use/Redeploy/Dispose (SBURD) Costs are added up and divided by the number of Enterprise employees to show how much the customer is spending on SBURD Costs per employee.

SBURD Cost per Employee=SBURD Cost/Enterprise Employees

Total Cost per Employee: Total Cost per Employee is the summation of Hard Output Cost per Employee, Infrastructure Cost per Employee, and SBURD Cost per Employee, and shows how much the customer is spending per employee. Comparing this number across projects, companies and industries is complicated by the fact that the inclusion of soft and SBURD costs is optional and varies by client.

Total Document Output Cost per Employee=Hard Output Cost per Employee+Infrastructure Cost per Employee+SBURD Cost per Employee Hard Output Cost per Page: The Hard Output Cost of Equipment, Service and Supplies in divided by the total output volume to show how much the customer is spending on Device Output Costs per page.

> Hard Output Cost per Page=[Sum of(Black Hard Output Cost)+Sum of(Color Hard Output Cost)]/Sum of(Total Monthly Volume)

Infrastructure Cost per Page: The Hard and Soft Infrastructure Costs are added up and divided by the total output volume to show how much the customer is spending on Infrastructure Costs per page.

> Infrastructure Cost per Page=Sum of(Hard Infrastructure Cost+Soft Infrastructure Cost)/Sum of(Total Monthly Volume)

Total Cost per Page: Total Cost per Page is the summation of all Hard Costs, all Soft Costs, and SBURD Costs divided by the total output volume to show how much the customer is spending per page. Comparing this number across projects, companies and industries is complicated by the fact that the inclusion of soft and SBURD costs is optional and varies by client.

> Total Cost per Page=(Sum of(Hard Cost+Soft Cost))+SBURD Cost/(Sum of (Total Monthly Volume))

An Asset's Total Cost is the summation of both the Output and Infrastructure costs associated with the asset. To make it easier to get the desired results the ODA system provides the user an option to include or exclude any or all of these costs in the calculations through the use of inclusion flags.

> Asset Total Cost=Hard Cost+Soft Cost

Hard Costs for an asset characterize those costs that can be saved when an asset is removed. These include all out-of-pocket expenses incurred while operating the output environment during a particular period (e.g., a month). For example, when an asset is removed it is unplugged and no longer uses electricity, resulting in a decrease in electricity costs. Each client may be different with respect to how they want their Infrastructure costs figured into Hard and or Soft costs. In one embodiment, the ODA system's "Project defaults" gives the user the flexibility to indicate how such costs may be characterized. Hard Costs are a summation of Hard Output costs and Infrastructure Costs configured as Hard Costs.

> Hard Cost=Black Hard Output Cost+Color Hard Output Cost+Hard Infrastructure Cost Conversely, Soft Costs are costs that will occur even after the Asset has been removed. As an example, when a client is renting a building and an asset is removed the client must still pay for the floor space the asset was using. Here again, each client may be different and the ODA system permits the association of various costs as hard or soft. Thus, Soft Costs are those (Infrastructure) Costs that cannot be recovered when an asset is removed.

> Soft Cost=Soft Infrastructure Cost

When calculating costs, costs directly associated to color output or volume will only be calculated as Color Costs, however costs associated to black output or volume will be proportionally divided between the black and color costs. The following formula is employed to determine how much of the black costs is to be proportionally divided between the Black and Color costs:

> Color Volume Ratio=Monthly Color Volume/Total Monthly Volume; and
>
> Black Volume Ratio=1−Color Volume Ratio Hard output Costs are those costs associated with the use and owner ship of equipment. Hard output costs include Equipment costs, Service Costs and Supplies Cost. Equipment Cost include, for example, Lease/Rental Contract, Depreciation, or Post-Depreciation costs. The ODA system will include Depreciation unless there is an Equipment (Lease) plan. The Service Cost (e.g., Service Contract or Service Costs) are handled by the ODA system including Service Costs unless there is a Service Contract. In the ODA system, Supplies Costs will include Consumables Costs unless there is an Equipment (Lease) plan that includes Supplies or a Supplies Contract. Note: If the equipment contract includes Supplies then neither "Supplies Contract Cost" nor "Consumable Cost" will be included in the Hard Output Cost.

> Black Hard Output Cost=(Black Equipment Contract Cost or Black Depreciation Cost)+(Black Service Contract Cost or Black Service Cost)+(Black Supplies Contract Cost or Black Consumable Cost)
>
> Color Hard Output Cost=(Color Equipment Contract Cost or Color Depreciation Cost)+(Color Service Contract Cost or Color Service Cost)+(Color Supplies Contract Cost or Color Consumable Cost)

Depreciation, as used above, is employed to amortize the cost of purchasing an asset over a set period. Accordingly, when the asset is not Fully Depreciated and the ODA system is instructed enable the characterization of Depreciation (Table A4):

> Asset Depreciation Cost=Asset Purchase Price/Asset Refresh Rate

When the Asset is fully depreciated, unless the "Including Post Depreciated Costs" is enabled the asset will not have any Monthly Equipment cost. In the ODA system this is call Post Depreciation or sometimes referred to as Asset Refresh Cost.

> Asset Depreciation Cost=(Asset Purchase Price/Asset Refresh Rate)×Percent of Post Depreciated Now if an asset is marked as "Expensed" that that asset will have no Monthly Depreciation related cost, and > Black Depreciation Cost=Black Volume Ratio×Asset Depreciation Cost,
>
> Color Depreciation Cost=Color Volume Ratio×Asset Depreciation Cost It will be appreciated that the ODA system needs to handle or accommodate various pricing contracts associated with assets (see Table A1). In some cases, such contracts may be fixed rate, a cost per page, or some combination thereof. Such contracts are used to charge a customer for the use or service of an asset, without having to having to present a detailed bill showing all of the individual costs associated with the service. In one embodiment, ODA allows for three types of contracts: Equipment, Service and Supplies. An asset can have no contracts, one of each, or a combination of contracts.

The following calculations may be employed to calculate a contract's cost for any of the afore-mentioned contracts:

> Monthly Black Volume=Asset Total Monthly Volume−Asset Total Monthly Color Volume If Monthly Black Volume>Asset's Contract Plan Black Allowance, then > Black Overage Cost=(Monthly Black Volume−Asset Contract Plan Black Allowance)×Asset Plan Black Excess Cost If Asset Total Monthly Color Volume>Asset's Contract Plan Color Allowance Color, then Overage Cost=(Asset Total Monthly Color Volume−Asset Contract Plan Color Allowance)×Asset Plan Color Excess Cost Black Contract Cost=Black Volume Ratio×(Asset Plan Base Cost+Black Overage Cost)

Color Contract Cost=Color Overage Cost+[Color Volume Ratio×(Asset Plan Base Cost+Black Overage Cost)], where As presently implemented, the following hierarchy of precedence is found in the ODA system: Equipment Contracts overrides. Depreciation, Cost Server Contracts overrides Service Cost, and Supplies Contracts overrides Consumables Cost.

Depending upon the client's requirements, the type of optimization analysis might range from an easy, "right-sizing an MFD installation", to a complex, "demonstrating cost inefficiencies in a heterogeneous environment to a resistant client". Right-sizing an MFD installation, the easiest case, requires that the model have accurate inventory and usage information and machine speed (BW and color, as appropriate) and usage period (see below) information. If you wanted to include hard costs, lease (as appropriate) and consumables costs also would be needed. The underlying assumptions here are that the customer has decided upon MFD devices, and is uninterested in characterizing the current or future states.

The ODA system calculates monthly volumes by extrapolating the observed volumes to a standardized month. The volume for each asset is measured over a defined period; the time between data collection phase 1 and data collection phase 2. The period volume is extrapolated for each asset into a monthly volume by ODA. Extrapolating utilization requires that the number of working days during the period be accurately characterized. For example, the average utilization values will differ using the same volumes for a 3-shift 7-day-per-week hospital clinical floor and a single-shift 5-day per week office environment. Using the same volume, the calculated utilization for the hospital would be lower than those calculated for the office.

Ideally, the measurement period start and end dates should be identical (or very close) for all assets in the analysis. ODA allows the user to specify the number of non-working (i.e. holidays) days in the observation period. Do not include weekends in this number; they are already included in the ODA parameter that defines the length of the workweek (i.e. 5 or 7 days)—only holidays that fall on days that otherwise would be workdays should be counted. Longer observation periods allow for more accurate characterization of the actual monthly volumes.

For the Purposes of calculating Monthly Volume ODA has set a standardized Month. This represents the average number of days in a month. Then based on the First and last Meter Reads all Asset Volume is normalized for that standardized Month. In one embodiment, the ODA Standard Month is 30 days. [January 31st-January 1st=30 days]

ODA uses the model and consumable prices from the models database to calculate hard costs. Any equipment or consumable discount values provided are applied to these costs. The customer may also provide a price to apply to every instance of a specific model, or provide prices for individual assets. Prices for the most prevalent and highest volume producing devices are updated more frequently in the central models database than those for less popular devices. Some customers may not know the costs of all the output devices in their environment. Despite the potential for inaccuracies of these prices the most important factors in determining relative cost is coverage and paper size distribution. For example, a color LaserJet page at 5% coverage (about the level of coverage of this page of text) might cost $0.08; at 25% coverage (a typical PowerPoint slide) the page will cost $0.40, five-times as much. Most equipment and/or supplies contracts effectively charge a constant amount per page.

Inventory data must be thorough. All asset volumes in an area must be accounted for, especially for asset's responsible for large fractions of area volume. Since the purpose of the future state configuration is to handle all area volume most cost effectively, all assets must be located and their volumes recorded.

Most output devices store the number of pages printed in the form of a meter or log and provide a means for retrieving them. A configuration page is the most common means for retrieving meter information. Configuration pages are usually viewed or printed using the asset's front panel; in some cases the configuration pages are printed when the asset powers up. The most important value to record is the total meter read; that is, the count of all pages printed by the asset. The number and naming of meters varies by manufacturer; and is often inconsistent for the same manufacturer.

Figure 21:
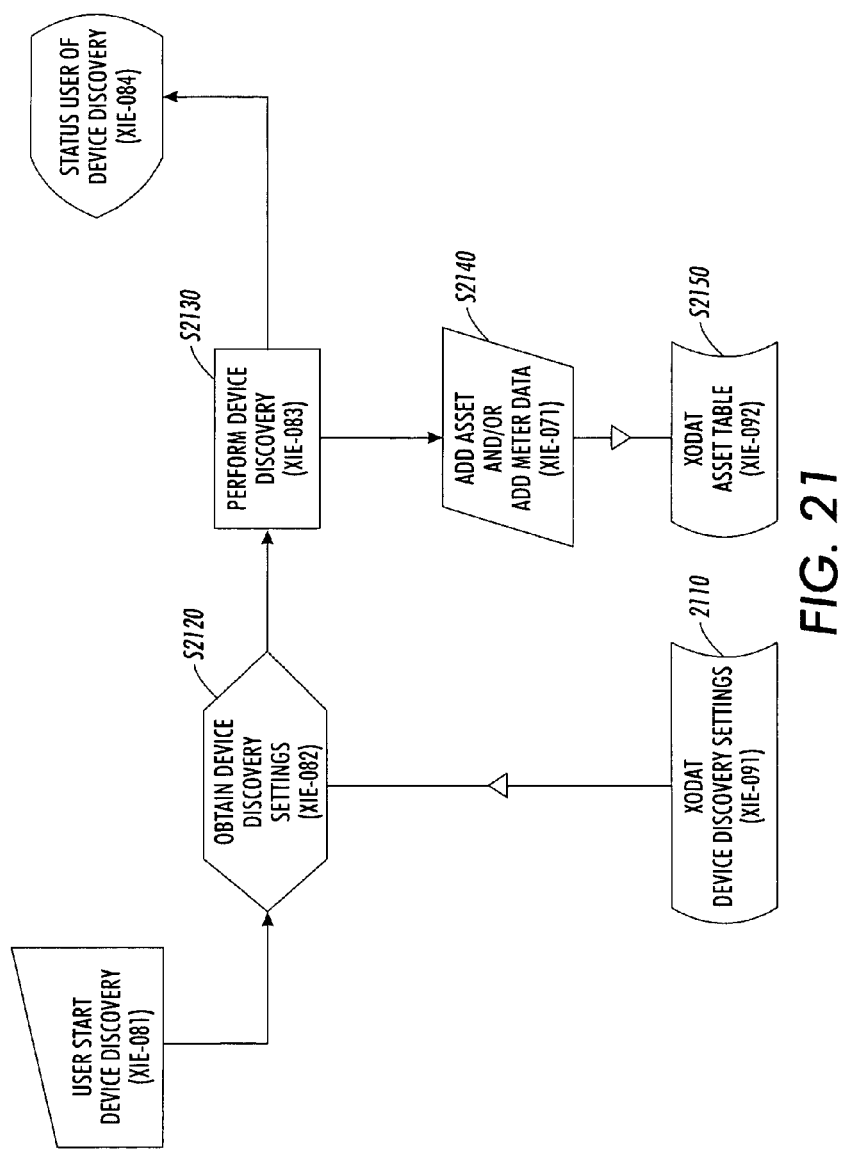
FIG. 21 is a flowchart representing the flow of data in a device discovery process that may be employed as part of the ODA application described herein.

When a user prints documents they use a workstation print queue to get the print job from the desktop to the printer. Referring to FIG. 21, XDM has a print Job Tracking Agent that can be installed on all of the workstations in a client's office environment. This agent will record every print job a user makes both those to networked printers and non-networked (or direct connect) printers. XDM job tracking data can be imported into ODA, which then combines the print jobs into queues based on the host server and print queue name. The ODA user can then associate these Queues to an asset resulting in print volume for that asset. As depicted in FIG. 21, the ODA system 2110 may interact with the device discovery system to obtain device information (S2120) and once performed, to report the data back to the ODA (S2130) in the form of an added asset 2140 that may be reflected in the asset table 2150.

Since color devices also print in B&W and most do not have meters to distinguish between these low and high cost jobs, the ODA system estimates how much B&W a color printer produces using a color fraction. ODA allows specification of a blanket color fraction to be applied to all color printers in an area, or it can be specified for individual assets. Lightly and heavily used color assets should have this fraction specified. Coverage, especially for color, has a significant affect on cost. Manufacturers specify coverage typically specify coverage as 5 or 6% for a consumable. The manufacturers also specify a page yield (number of letter-size pages) that a consumable produces at the given coverage. The consumable price, yield and coverage and actual coverage are used to calculate the cost per page for a consumable. In color devices, which may use four or more consumables, the cost of each consumable used is included in the cost-per-page calculation.

Equipment Contracts are based on a predicted average coverage that is reflected in the rates for the equipment. As coverage increases for assets on Equipment Contracts operating costs remain constant. However, assets for which consumables are directly purchased become increasingly more expensive to operate. By default all cost-per-page calculations are based on use of US Letter-size paper. When customers use different size papers, their average cost per page will vary; cost increases when consumables are used to cover larger paper areas. ODA allows the user to specify the paper size distribution used project-wide or individual assets.

If the asset's volume is manually set by the user, then it will not attempt to calculate average monthly volume, otherwise ODA will calculate the average monthly volume by comparing two meters. In the event there is only one meter reading, and a single meter mode is enabled, then the ODA system may attempt to calculate average monthly volume based on the single meter and the asset purchase date. Only when there are no meters and the user has assigned Print Job Volume to the asset, will ODA calculate the average monthly volume based on the print queues.

Within ODA several calculations that take dates into consideration. Some of these, like Asset Age, are based on when something was done. Others like the number of months remaining on a contract are based on when an event, such as the end of a contract, will happen. In all of these calculations there needs to be a point of reference as to when the analysis is taking place. For instance the Asset's Age is typically the difference between the purchase date and the current date. However, with ODA being a database that could be opened at any time a fixed analysis date needs to be set. To facilitate this, the fixed analysis date is set within the project defaults window. When the Project is first created this date is set to the Project End Date. However if a user changes the Project End Date the Fixed Analysis Date will NOT be changed.

ODA allows specification of discounts for equipment and supplies for each model (device) class (e.g. copier, printer, fax . . . ) that is applied to the list price to determine the respective costs. These discounts are applied to prices from the models database, but not to prices directly provided (i.e. specifically entered) for models (devices) or consumables.

The claims, as, originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An assessment method, comprising:
    capturing, using a computer, a current state of a customer's office document equipment environment and storing the current state in memory associated with the computer, the environment including office document device inventory, cost of operation and usage information for a plurality of pieces of office document equipment;
    analyzing the current state of the customer's office document equipment environment stored in the memory within a plurality of defined areas to characterize at least one cost and usage metric for each area, and aggregating such cost and usage metrics to generate project metrics, wherein analyzing the current state of the customer's office document equipment environment further comprises:
        entering inventory information, including equipment inventory and volume data, and mapping the equipment; and
        entering financial data relating to the cost of operation of at least one piece of equipment;
    the computer further generating a report depicting the current state of the customer's office document equipment environment in association with the project metrics;
    modeling, on the computer, projected operating costs of an optimized office document equipment environment for the customer, said model being based upon the usage metrics for the plurality of defined areas;
    downloading a models database to a local computer workstation, said models database including data reflecting office document equipment specifications and operating costs; and
    importing the models database for use relative to the current state.

2. The method of claim 1, further comprising reporting the current state of the customer's office document equipment environment and the optimized office output device environment, including projected costs and efficiencies thereof.

3. The method of claim 1, wherein capturing a current state of a customer's office document equipment environment, further comprises:
    creating a project, including entry of project properties and contact information;
    creating a project tree, including location information of current equipment to produce input maps; and
    generating at least one data collection document, said document including a gridded floor map and at least one associated data collection worksheet.

4. The method of claim 1, wherein the models database is employed for capturing the current state.

5. The method of claim 1, wherein the models database is employed for analyzing the current state.

6. The method of claim 1, wherein capturing a current state of the customer's office document equipment environment further comprises:
    connecting the computer to a customer's network and automatically collecting device and usage information from equipment connected to the network; and
    importing the device and usage information into the characterization of the current state of the customer's office document equipment environment.

7. The method of claim 6, further comprising:
    installing tracking software on a plurality of user workstations in at least one customer location; and
    collecting, over a predetermined period of time, print job tracking data for the plurality of users in the at least one location in order to estimate print volumes from each of the plurality of users.

8. The method of claim 1, further comprising:
    validating the current state of the customer's office document equipment environment with the customer;
    printing a client data report;
    verifying the inventory data;
    verify default cost profiles and settings reflected from the models database, and including customer-specific values; and
    making any necessary corrections.

9. The method of claim 1, further comprising collecting usage data for at least one piece of equipment over a period of time.

10. The method of claim 1, wherein modeling projected operating costs of an optimized office output device equipment environment for the customer comprises the characterization of at least one metric from the group consisting of:
    employee to device ratio;
    device utilization;
    pages per employee ratio;
    hard output cost per employee;
    infrastructure cost per employee;
    SBURD cost per employee;
    total cost per employee;
    hard output cost per page;
    infrastructure cost per page; and
    total cost per page.

* * * * *